(12) United States Patent
Seregin et al.

(10) Patent No.: US 10,021,414 B2
(45) Date of Patent: Jul. 10, 2018

(54) BITSTREAM CONSTRAINTS AND MOTION VECTOR RESTRICTION FOR INTER-VIEW OR INTER-LAYER REFERENCE PICTURES

(71) Applicant: QUALCOMM Incorporated, San Diego, CA (US)

(72) Inventors: Vadim Seregin, San Diego, CA (US); Ying Chen, San Diego, CA (US); Li Zhang, San Diego, CA (US); Adarsh Krishnan Ramasubramonian, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1084 days.

(21) Appl. No.: 14/146,149

(22) Filed: Jan. 2, 2014

(65) Prior Publication Data

US 2014/0192885 A1 Jul. 10, 2014

Related U.S. Application Data

(60) Provisional application No. 61/749,213, filed on Jan. 4, 2013, provisional application No. 61/754,864, filed on Jan. 21, 2013, provisional application No. 61/755,274, filed on Jan. 22, 2013, provisional application No. 61/758,206, filed on Jan. 29, 2013.

(51) Int. Cl.
| | |
|---|---|
| *H04N 19/55* | (2014.01) |
| *H04N 19/597* | (2014.01) |
| *H04N 19/52* | (2014.01) |
| *H04N 19/70* | (2014.01) |
| *H04N 19/31* | (2014.01) |

(52) U.S. Cl.
CPC ............ *H04N 19/55* (2014.11); *H04N 19/31* (2014.11); *H04N 19/52* (2014.11); *H04N 19/597* (2014.11); *H04N 19/70* (2014.11)

(58) Field of Classification Search
CPC ...................................................... H04N 19/55
USPC ................................................... 375/240.16
See application file for complete search history.

(56) References Cited

U.S. PATENT DOCUMENTS

| | | | |
|---|---|---|---|
| 8,094,722 | B2 | 1/2012 | Wang |
| 8,432,975 | B2 | 4/2013 | Yang et al. |
| 2008/0013633 | A1 | 1/2008 | Ye et al. |
| 2008/0089412 | A1 | 4/2008 | Ugur et al. |
| 2011/0122944 | A1 | 5/2011 | Gupta et al. |
| 2012/0213290 | A1 | 8/2012 | Hugosson et al. |

(Continued)

FOREIGN PATENT DOCUMENTS

| | | |
|---|---|---|
| CN | 102461171 A | 5/2012 |
| JP | 2011519226 A | 6/2011 |

(Continued)

OTHER PUBLICATIONS

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

(Continued)

*Primary Examiner* — Yulin Sun
(74) *Attorney, Agent, or Firm* — Shumaker & Sieffert, P.A.

(57) ABSTRACT

Techniques are described for motion vector restriction where information in a bitstream ensures that a derived motion vector from a motion vector predictor is compliant with a motion vector restriction. Techniques are also described for indicating the motion vector restriction for parallel decoding.

39 Claims, 7 Drawing Sheets

(56) References Cited

U.S. PATENT DOCUMENTS

| | | | |
|---|---|---|---|
| 2013/0176389 A1 | 7/2013 | Chen et al. | |
| 2013/0335527 A1 | 12/2013 | Takahashi et al. | |

FOREIGN PATENT DOCUMENTS

| | | |
|---|---|---|
| TW | I375472 B | 10/2012 |
| TW | I379594 B | 12/2012 |
| WO | 2009131688 A2 | 10/2009 |
| WO | 2012128068 A1 | 9/2012 |
| WO | 2012176684 A1 | 12/2012 |
| WO | 2013001730 A1 | 1/2013 |
| WO | 2013028117 A1 | 2/2013 |

OTHER PUBLICATIONS

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 9," 11th Meeting: Shanghai, CN, , JCTVC-K1003_v7, Nov. 2, 2012, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Ikai et al., "3D-CE.5 related: Disparity vector restrictions," JCT-3V Meeting; MPEG Meeting; Shanghai; (The Joint Collaborative Team on 3D Video Coding Extension Development of ISO/IEC JTC1/SC29/WG11 and ITU-T SG.16 ); URL: http://phenix.int-evry.fr/jct2/,, No. JCT3V-B0112, Oct. 13-19, 2012, 7 pp.

International Preliminary Report on Patentability—PCT/US2014/010161, The International Bureau of WIPO—Geneva, Switzerland, dated Feb. 26, 2015, 9 pp.

International Search Report and Written Opinion—PCT/US2014/010161—ISA/EPO—dated Apr. 22, 2014, 13 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Nakagami et al., "MV-HEVC: Vertical length restriction of inter-view vector for Hevc simple 3D extension," JCT-3V Meeting; MPEG Meeting; Shanghai; (The Joint Collaborative Team on 3D Video Coding Extension Development of ISO/IEC JTC1/SC29/WG11 and ITU-T SG.16 ); URL: http://phenix.int-evry.fr/jct2/,, No. JCT3V-B0037, Oct. 13-19, 2012, 7 pp.

Uchiumi et al., "3D-HEVC: Restricted motion vector coding for inter-view prediction," JCT-3V Meeting; MPEG Meeting; Shanghai; (The Joint Collaborative Team on 3D Video Coding Extension Development of ISO/IEC JTC1/SC29/WG11 and ITU-T SG.16 ); URL: http://phenix.int-evry.fr/jct2/,, No. JCT3V-B0113, Oct. 13-19, 2012, 4 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Wiegand et al., "WD1: Working Draft 1 of High-Efficiency Video Coding", JCTVC-C403, 3rd Meeting: Guangzhou, CN, Oct. 7-15, 2010, 137 pp.

ITU-T H.265, Series H: Audiovisual and Multimedia Systems, Infrastructure of audiovisual services—Coding of moving video, Advanced video coding for generic audiovisual services, The International Telecommunication Union, Oct. 2014, 540 pp.

ITU-T H.265, Series H: Audiovisual and Multimedia Systems, Infrastructure of audiovisual services—Coding of moving video, High efficiency video coding, The International Telecommunication Union, Apr. 2013, 317 pp.

Tech et al., "MV-HEVC Draft Text 2," Joint Collaborative Team on 3D Video Coding Extension Development of ITU-T SG 16 WP 3 and ISO/IEC JTC 1/SC 29/WG 11, Document: JCT3V-B1004_d0, Oct. 13-19, 2012, 22 pp.

Bross et al., "High efficiency video coding (HEVC) text specification draft 9," 11th Meeting: Shanghai, CN, JCTVC-K1003_v13, Dec. 18, 2012, 317 pp.

Xiu et al., "TE A2: Inter-layer reference picture placement," Joint Collaborative Team on Video Coding (JCT-VC) of ITU-T SG 16 WP 3 and ISO/IEC JTC 1/SC 29/WG 11, Document: JCTVC-L0051, Jan. 14-23, 2013, 8 pp.

Bross et al., "Editors' proposed corrections to Hevc version 1," Joint Collaborative Team on Video Coding (JCT-VC) of ITU-T SG 16 WP 3 and ISO/IEC JTC 1/SC 29/WG 11, Document: JCTVC-M0432_v3, Apr. 18-26, 2013, 310 pp.

Skupin et al., "Inter-layer delay indication in VUI (combining aspects of JCTVC-M0200, JCT3V-D0064 and JCT3V-D0199)," Joint Collaborative Team on Video Coding (JCT-VC) of ITU-T SG 16 WP 3 and ISO/IEC JTC 1/SC 29/WG 11, Document: JCTVC-M0463r1, Apr. 18-26, 2013, 6 pp.

Second Written Opinion of International Application No. PCT/US2014/010161, dated Dec. 4, 2014, 7 pp.

Jung, et al., "Proposition for robust parsing with temporal predictor," Document JCTVC-D197, 4th Meeting: Daegu, KR, Jan. 20-28, 2011, 6 pp.

Tech, et al., "3D-HEVC Test Model 1," Document JCT3V-A1005_d0, Joint Collaborative Team on 3D Video Coding Extension Development of ITU-T SG 16 WP 3 and ISO/IEC JTC 1/SC 29/WG 11, 1st Meeting: Stockholm, SE, Jul. 16-20, 2012, 83 pp.

BITSTREAM CONSTRAINTS AND MOTION VECTOR RESTRICTION FOR INTER-VIEW OR INTER-LAYER REFERENCE PICTURES

This application claims the benefit of U.S. Provisional Application No. 61/749,213, filed Jan. 4, 2013, U.S. Provisional Application No. 61/754,864, filed Jan. 21, 2013, U.S. Provisional Application No. 61/755,274, filed Jan. 22, 2013, and U.S. Provisional Application No. 61/758,206, filed Jan. 29, 2013, the entire contents of each of which are incorporated herein by reference.

TECHNICAL FIELD

This disclosure relates to video coding and, more particularly, to techniques for coding video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques include spatial prediction and/or temporal prediction to reduce or remove redundancy inherent in video sequences. For block-based video coding, a video frame or slice may be partitioned into blocks. Each block can be further partitioned. Blocks in an intra-coded (I) frame or slice are encoded using spatial prediction with respect to reference samples in neighboring blocks in the same frame or slice. Blocks in an inter-coded (P or B) frame or slice may use spatial prediction with respect to reference samples in neighboring blocks in the same frame or slice or temporal prediction with respect to reference samples in other reference frames. Spatial or temporal prediction results in a predictive block for a block to be coded. Residual data represents pixel differences between the original block to be coded and the predictive block.

An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in a particular order to produce a one-dimensional vector of transform coefficients for entropy coding.

SUMMARY

In general, this disclosure describes video coding techniques that ensure that a derived motion vector does not violate a motion vector restriction. For example, a video encoder may signal syntax elements in a bitstream that define the manner in which a video decoder is to derive a motion vector. The techniques may ensure that the bitstream does not include syntax element values that would cause the video decoder to derive a motion vector that violates a motion vector restriction.

The disclosure also describes techniques for indicating decoding delay, which may be useful for parallel decoding. For instance, the techniques may indicate decoding delay that can be universally used by a video decoder for parallel decoding. Such techniques for indicating decoding delay may be used in conjunction with techniques that ensure that a derived motion vector does not violate a motion vector restriction. However, the techniques described in this disclosure are not so limited.

In one example, the disclosure describes a method of inter-view or inter-layer video decoding, the method comprising receiving a bitstream that includes information for deriving a motion vector for a current block from a motion vector predictor, wherein the motion vector refers to an inter-view or an inter-layer reference picture, wherein the bitstream is constrained such that the information ensures that the derived motion vector is compliant with a motion vector restriction, and wherein the motion vector restriction restricts a range of the motion vector to refer to a sub-portion of the inter-view or inter-layer reference picture. The method also includes deriving the motion vector for the current block based on the information in the bitstream, and inter-view or inter-layer prediction decoding the current block based on the derived motion vector.

In one example, the disclosure describes a method of inter-view or inter-layer video encoding, the method comprising determining information, which is used for deriving a motion vector for a current block from a motion vector predictor, that ensures that the derived motion vector is compliant with a motion vector restriction, wherein the motion vector refers to an inter-view or an inter-layer reference picture, and wherein the motion vector restriction restricts a range of the motion vector to refer to a sub-portion of the inter-view or inter-layer reference picture. The method also includes deriving the motion vector for the current block based on the information, inter-view or inter-layer prediction encoding the current block based on the derived motion vector, and generating for output the determined information for deriving the motion vector.

In one example, the disclosure describes a device comprising a video decoder, the video decoder comprising one or more processors and configured to receive a bitstream that includes information for deriving a motion vector for a current block from a motion vector predictor, wherein the motion vector refers to an inter-view or an inter-layer reference picture, wherein the bitstream is constrained such that the information ensures that the derived motion vector is compliant with a motion vector restriction, and wherein the motion vector restriction restricts a range of the motion vector to refer to a sub-portion of the inter-view or inter-layer reference picture. The video decoder is also configured to derive the motion vector for the current block based on the information in the bitstream, and inter-view or inter-layer prediction decode the current block based on the derived motion vector.

In one example, the disclosure describes a device comprising a video encoder, the video encoder comprising one or more processors and configured to determine information, which is used for deriving a motion vector for a current block from a motion vector predictor, that ensures that the derived motion vector is compliant with a motion vector restriction, wherein the motion vector refers to an inter-view or an inter-layer reference picture, and wherein the motion vector restriction restricts a range of the motion vector to refer to a sub-portion of the inter-view or inter-layer reference picture. The video encoder is also configured to derive the motion vector for the current block based on the information, inter-view or inter-layer prediction encode the current block based on the derived motion vector, and generate for output the determined information for deriving the motion vector.

In one example, the disclosure describes a computer-readable storage medium having stored thereon instructions that when executed cause one or more processors of a device for decoding video data to receive a bitstream that includes information for deriving a motion vector for a current block from a motion vector predictor, wherein the motion vector refers to an inter-view or an inter-layer reference picture, wherein the bitstream is constrained such that the information ensures that the derived motion vector is compliant with a motion vector restriction, and wherein the motion vector restriction restricts a range of the motion vector to refer to a sub-portion of the inter-view or inter-layer reference picture. The instructions also cause the one or more processors to derive the motion vector for the current block based on the information in the bitstream, and inter-view or inter-layer prediction decode the current block based on the derived motion vector.

In one example, the disclosure describes a device comprising means for receiving a bitstream that includes information for deriving a motion vector for a current block from a motion vector predictor, wherein the motion vector refers to an inter-view or an inter-layer reference picture, wherein the bitstream is constrained such that the information ensures that the derived motion vector is compliant with a motion vector restriction, and wherein the motion vector restriction restricts a range of the motion vector to refer to a sub-portion of the inter-view or inter-layer reference picture. The device also includes means for deriving the motion vector for the current block based on the information in the bitstream, and means for inter-view or inter-layer prediction decoding the current block based on the derived motion vector.

The details of one or more examples are set forth in the accompanying drawings and the description below. Other features, objects, and advantages will be apparent from the description and drawings, and from the claims.

DETAILED DESCRIPTION

Figure 1:
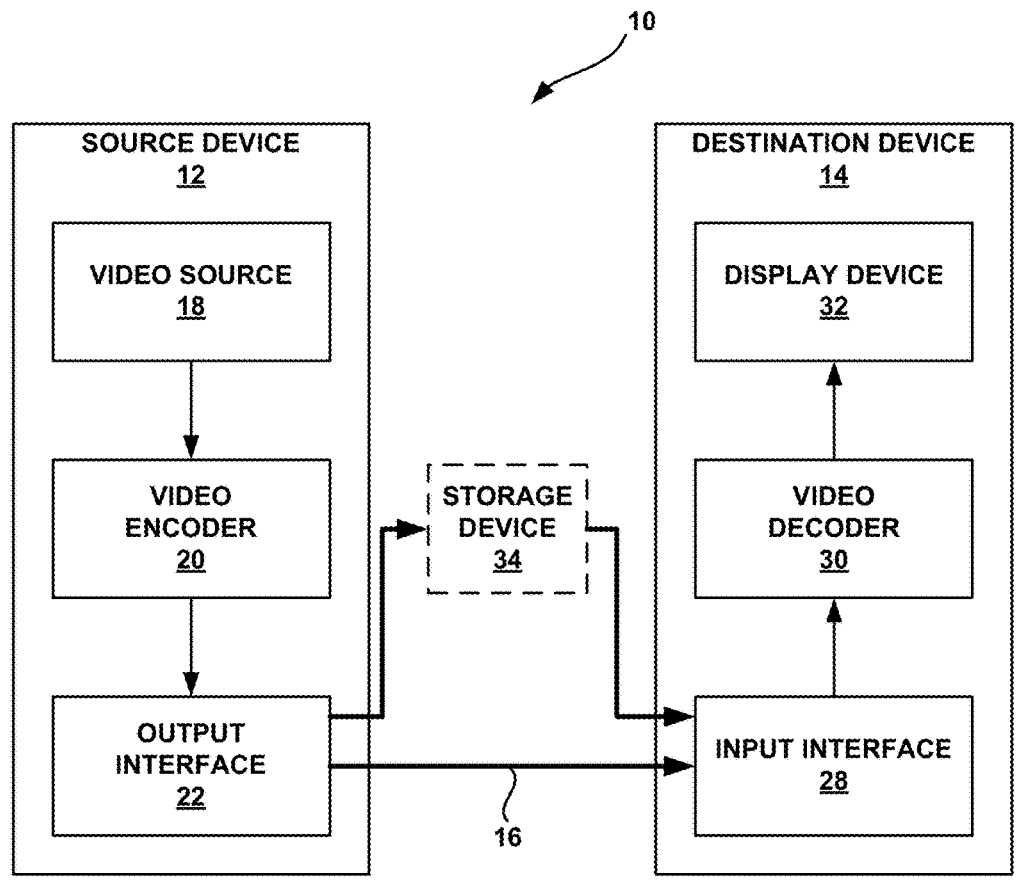
FIG. 1 is a block diagram illustrating an example video encoding and decoding system that may utilize the techniques described in this disclosure.

Motion vector restriction refers to limiting at least one of an x-component or a y-component of a motion vector to within a range of values. In this way, motion vector restriction restricts the blocks of a reference picture that can be used to inter-predict a current block. For example, if the y-component is restricted to be within a certain range, then any block in the reference picture that is outside of the y-component range cannot be used to inter-predict the current block. In general, motion vector restriction can be used to limit a range of the motion vector to refer to a sub-portion of the reference picture, which as described in more detail may be an inter-view or inter-layer reference picture.

There may be various reasons why motion vector restriction may be useful. As one example, motion vector restriction may reduce the amount of data of a reference picture that needs to be accessed for inter-predicting a current block, which increases memory bandwidth efficiency. For example, video data of blocks that reside outside of the restriction range may not need to be accessed for inter-predicting the current block.

As another example, motion vector restriction may enable parallel decoding. For example, in multiview video coding or scalable video coding, a picture in a dependent view or layer may be inter-predicted (e.g., inter-view predicted or inter-layer predicted) with a picture in a reference view or layer (e.g., a base view or layer). Without motion vector restriction, a video decoder may need to reconstruct the entire reference view or layer picture before reconstructing the dependent view or layer picture. For this reason, motion vector restriction may be desirable to avoid the need to reconstruct the entire reference view or layer picture before reconstructing the dependent view or layer picture.

Moreover, with motion vector restriction, a video decoder may be able to reconstruct the dependent view or layer picture in parallel with the reference view or layer picture. For example, assume that the motion vector restriction defines that the y-component of a motion vector for any block in the dependent view or layer picture cannot be more than Th in the reference view or layer (e.g., base view or layer), where Th defines the y-component restriction. In other words, if a current block is located at (x, y) in the dependent view or layer picture, only blocks that are located at (x, y+Th) in the reference view or layer picture or above can be used to inter-predict the current block.

In this example, after the video decoder reconstructs the reference view or layer picture up to the y+Th block, the video decoder may be able to reconstruct the dependent view or layer picture in parallel with the reference view or layer picture. The reason for this is that any block after the y+Th block in the reference view or layer picture cannot be used to inter-predict a block in the dependent view or layer picture with a y-component value of "y." In this sense, the motion vector restriction may define a parallel decoding delay (i.e., a number of rows of the reference view or layer picture that have to be reconstructed before the video decoder can start the reconstruction of the dependent view or layer picture). In some examples, based on the type of filtering used in reconstructing the reference view or layer picture, the video decoder may not be able to begin the reconstruction of the dependent view or layer picture until some blocks in rows after the y+Th rows are reconstructed.

However, there may be issues with using motion vector restriction. For example, in many cases, the video encoder may not signal the information (e.g., syntax elements) of the actual motion vector of the current block. Rather, the video encoder may signal information (e.g., syntax elements) from which the video decoder derives the motion vector. As one example, rather than signaling the information of the motion vector of the current block, the video encoder may signal an index into a list of candidate motion vector predictors as part of merge/skip mode or advanced motion vector prediction (AMVP) mode. The video decoder may select a motion vector predictor from the list of candidate motion vector predictors based on the received index and derive the motion vector for the current block based on the motion vector predictor. In some of these examples, in deriving the motion vector, it may be possible for the video decoder to derive a motion vector that violates the motion vector restriction.

For example, in merge/skip mode, the video decoder adopts the motion vector of the motion vector predictor (i.e., sets the motion vector of the current block equal to the motion vector predictor). There may be no guarantee that if the motion vector of the current block is set equal to the motion vector predictor that the motion vector would comply with the motion vector restriction of the current block.

As another example, in AMVP mode, the video decoder receives a motion vector difference (MVD) between the selected motion vector predictor and a motion vector determined from a best-match search. The video decoder adds the MVD to the selected motion vector predictor to derive the motion vector for the current block. However, in some examples, it may be possible that by adding the MVD to the motion vector predictor, the resulting derived motion vector violates the motion vector restriction.

There may be other such issues present when using motion vector restriction such as in the temporal motion vector predictor (TMVP) described in more detail below. There also may be issues with a MVD flag that indicates that all MVDs for motion vector predictors that refer to a particular reference picture list are zeros when using motion vector restriction, as described in more detail below.

The techniques described in this disclosure may ensure that the information in the bitstream that the video decoder uses for deriving the motion vector ensures that the derived motion vector does not violate the motion vector restriction. As one example, for merge/skip mode, the techniques may ensure that the bitstream does not include an index into a list of candidate motion vector predictors for a motion vector predictor that if adopted as the motion vector for the current block would cause the derived motion vector to violate the motion vector restriction. As another example, for AMVP mode, the techniques may ensure that the bitstream includes an MVD that when added to the motion vector predictor causes the resulting derived motion vector to be compliant with the motion vector restriction.

There may also be issues or concerns with using motion vector restriction as part of parallel decoding. Some techniques may set the parallel decoding delay to a fixed value of two macroblock rows. However, some recent video coding standards do not rely upon macroblocks and instead use a hierarchical structure of treeblocks or largest coding units (LCUs) or coding tree units (CTUs). Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node (i.e., a coded video block). As such, the concept of "rows" from compression techniques that use "macroblocks" may not apply well to techniques that use treeblocks instead of macroblocks.

Indeed, there may be no straightforward extension from macroblock rows to block rows in video coding standards that utilize such a hierarchical structure. In other words, there may be no straightforward way of parallel decoding delay of two macroblock rows in video coding techniques that use the treeblock hierarchical structure.

To overcome the limitations of fixing the motion vector restriction to a number of macroblock rows, some techniques signal the motion vector restriction such as in units of LCU rows. However, the video decoder may still need to convert the units of LCU rows to values that the video decoder can utilize to determine when to begin the parallel decoding (e.g., the parallel decoding delay).

As one example, the video decoder may need to convert the LCU rows into values the video decoder can utilize to determine when to begin the parallel decoding based on the LCU size. However, there may be no uniform way in which every video decoder may convert the LCU rows into values the video decoder can utilize for parallel decoding, resulting in different video decoders determining a different amount of parallel decoding delay. Different video decoders determining different amounts of parallel decoding delay may result in decoding inefficiencies, and possibly decoding errors.

In some examples, the techniques described in this disclosure may signal parallel decoding delay in coding unit sizes. In this manner, there may be a consistent way in which every video decoder may be able to determine the parallel decoding delay. For instance, the video decoders may not need any further conversion of the received parallel decoding delay information into a value that can be utilized to determine when parallel decoding can begin.

FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 34. Similarly, encoded data may be accessed from storage device 34 by input interface. Storage device 34 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 34 may correspond to a file server or another intermediate storage device that may hold the encoded video generated by source device 12. Destination device 14 may access stored video data from storage device 34 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 34 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 34 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 34, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server. In this disclosure, the term "information" in the bitstream is used to generally refer to any information in the bitstream including syntax elements.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the ITU-T H.264 standard, alternatively referred to as MPEG-4, Part 10, Advanced Video Coding (AVC), or extensions of such standards. Alternatively, video encoder 20 and video decoder 30 may operate according to other proprietary or industry standards, such as the High Efficiency Video Coding (HEVC) standard, and may conform to the HEVC Test Model (HM). The techniques of this disclosure, however, are not limited to any particular coding standard. Other examples of video compression standards include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure.

Each of video encoder 20 and video decoder 30 may be included in one or more encoders or decoders, either of which may be integrated as part of a combined encoder/decoder (CODEC) in a respective device. As one example, a device may include video decoder 30, and one example of the device is an integrated circuit (IC) and another example of the device is a micro-processor. As another example, a device may include video decoder 30, and one example of the device is a wireless communication device. Video encoder 20 may be similarly formed in an IC, micro-processor, or in a wireless communication device.

There is a new video coding standard, namely High-Efficiency Video Coding (HEVC), developed by the Joint Collaboration Team on Video Coding (JCT-VC) of ITU-T Video Coding Experts Group (VCEG) and ISO/IEC Motion Picture Experts Group (MPEG). The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

A recent Working Draft (WD) of HEVC, and referred to as HEVC WD9 hereinafter, is available from http://phenix.int-evry.fr/jct/doc_end_user/documents/11_Shanghai/wg11/JCTVC-K1003-v13.zip. Another recent draft of the HEVC standard, referred to as "HEVC Working Draft 10" or "WD10," is described in document JCTVC-L1003v34, Bross et al., "High efficiency video coding (HEVC) text specification draft 10 (for FDIS & Last Call)," Joint Collaborative Team on Video Coding (JCT-VC) of ITU-T SG16 WP3 and ISO/IEC JTC1/SC29/WG11, 12th Meeting: Geneva, CH, 14-23 Jan., 2013, which is downloadable from http://phenix.int-evry.fr/jct/doc_end_user/documents/12_Geneva/wg11/JCTVC-L1003-v34.zip. Yet another draft of the HEVC standard, is referred to herein as "WD10 revisions" described in Bross et al., "Editors' proposed corrections to HEVC version 1," Joint Collaborative Team on Video Coding (JCT-VC) of ITU-T SG16 WP3 and ISO/IEC JTC1/SC29/WG11, 13$^{th}$ Meeting, Incheon, KR, April 2013, which is available from http://phenix.int-evry.fr/jct/doc_end_user/documents/13_Incheon/wg11/JCTVC-M0432-v3.zip. The contents of the HEVC WD9, WD10, and WD10 revisions are incorporated by reference herein in their entirety.

In general, the working model of the HM describes that a video frame or picture may be divided into a sequence of treeblocks or largest coding units (LCU) that include both luma and chroma samples. A treeblock may have a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded (intra-predicted), the PU may include data describing an intra-prediction mode for the PU. As another example, when the PU is inter-mode encoded (inter-predicted), the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0 (L0) or List 1 (L1)) for the motion vector. List 0 and List 1 may be referred to as RefPicList0 and RefPicList1, respectively.

In general, a TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

For example, for video coding according to the high efficiency video coding (HEVC) standard currently under development, a video frame (also referred to as a picture) may be partitioned into coding units (CUs), prediction units (PUs), and transform units (TUs). A CU generally refers to an image region that serves as a basic unit to which various coding tools are applied for video compression. A CU typically has a square geometry, and may be considered to be similar to a so-called "macroblock" under other video coding standards, such as, for example, ITU-T H.264.

To achieve better coding efficiency, a CU may have a variable size depending on the video data it contains. That is, a CU may be partitioned, or "split" into smaller blocks, or sub-CUs, each of which may also be referred to as a CU. In addition, each CU that is not split into sub-CUs may be further partitioned into one or more PUs and TUs for purposes of prediction and transform of the CU, respectively.

PUs may be considered to be similar to so-called partitions of a block under other video coding standards, such as H.264. PUs are the basis on which prediction for the block is performed to produce "residual" coefficients. Residual coefficients of a CU represent a difference between video data of the CU and predicted data for the CU determined using one or more PUs of the CU. Specifically, the one or more PUs specify how the CU is partitioned for the purpose of prediction, and which prediction mode is used to predict the video data contained within each partition of the CU.

One or more TUs of a CU specify partitions of a block of residual coefficients of the CU on the basis of which a transform is applied to the block to produce a block of residual transform coefficients for the CU. The one or more TUs may also be associated with the type of transform that is applied. The transform converts the residual coefficients from a pixel, or spatial domain to a transform domain, such as a frequency domain. In addition, the one or more TUs may specify parameters on the basis of which quantization is applied to the resulting block of residual transform coefficients to produce a block of quantized residual transform coefficients. The residual transform coefficients may be quantized to possibly reduce the amount of data used to represent the coefficients.

A CU generally includes one luminance component, denoted as Y, and two chrominance components, denoted as U and V. In other words, a given CU that is not further split into sub-CUs may include Y, U, and V components, each of which may be further partitioned into one or more PUs and TUs for purposes of prediction and transform of the CU, as previously described. For example, depending on the video sampling format, the size of the U and V components, in terms of a number of samples, may be the same as or different than the size of the Y component. As such, the techniques described above with reference to prediction, transform, and quantization may be performed for each of the Y, U, and V components of a given CU.

To encode a CU, one or more predictors for the CU are first derived based on one or more PUs of the CU. A predictor is a reference block that contains predicted data for the CU, and is derived on the basis of a corresponding PU for the CU, as previously described. For example, the PU indicates a partition of the CU for which predicted data is to be determined, and a prediction mode used to determine the predicted data. The predictor can be derived either through intra-(I) prediction (i.e., spatial prediction) or inter-(P or B) prediction (i.e., temporal prediction) modes. Hence, some CUs may be intra-coded (I) using spatial prediction with respect to neighboring reference blocks, or CUs, in the same frame, while other CUs may be inter-coded (P or B) with respect to reference blocks, or CUs, in other frames.

Upon identification of the one or more predictors based on the one or more PUs of the CU, a difference between the original video data of the CU corresponding to the one or more PUs and the predicted data for the CU contained in the one or more predictors is calculated. This difference, also referred to as a prediction residual, comprises residual coefficients, and refers to pixel differences between portions of the CU specified by the one or more PUs and the one or more predictors, as previously described. The residual coefficients are generally arranged in a two-dimensional (2-D) array that corresponds to the one or more PUs o the CU.

To achieve further compression, the prediction residual is generally transformed, e.g., using a discrete cosine transform (DCT), integer transform, Karhunen-Loeve (K-L) transform, or another transform. The transform converts the prediction residual, i.e., the residual coefficients, in the spatial domain to residual transform coefficients in the transform domain, e.g., a frequency domain, as also previously described. The transform coefficients are also generally arranged in a 2-D array that corresponds to the one or more TUs of the CU. For further compression, the residual transform coefficients may be quantized to possibly reduce the amount of data used to represent the coefficients, as also previously described.

To achieve still further compression, an entropy coder subsequently encodes the resulting residual transform coefficients, using Context Adaptive Variable Length Coding (CAVLC), Context Adaptive Binary Arithmetic Coding (CABAC), Probability Interval Partitioning Entropy Coding (PIPE), or another entropy coding methodology. Entropy coding may achieve this further compression by reducing or removing statistical redundancy inherent in the video data of the CU, represented by the coefficients, relative to other CUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a pre-defined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data (e.g., information associated with the encoded video data) for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 and video decoder 30 may be configured to implement the techniques described in this disclosure. Video encoder 20 and video decoder 30 may be commonly referred to as a video coder. In examples of this disclosure, the video coder may determine at least one of a motion vector range and a row/column delay, and may inter-predict a block based on the determination. In some examples, the video coder may access at least one of a picture in a different view and a picture in a different layer based on one or more constraints, and may inter-view or inter-layer predict a block based on the accessed picture.

For example, the above described techniques with respect to the HEVC standard. This disclosure may be related to the High Efficiency Video Coding (HEVC) standard and its extensions like scalable video coding (SVC), sometimes referred to as SHVC, and multi-view video coding (MVC, 3DV), sometimes referred to as MV-HEVC and 3DV-HEVC. However, the techniques described in this disclosure should not be considered limited to any particular standard, and the description of any standard or any extension is provided merely for purposes of illustration.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. Multiview video coding (MVC) is an extension of H.264/AVC. The recent, publicly available joint draft of the MVC extension is described in "Advanced video coding for generic audiovisual services," ITU-T Recommendation H.264, March 2010. A more recent, publicly available joint draft of the MVC extension is described in "Advanced video coding for generic audiovisual services," ITU-T Recommendation H.264, June 2011. A current joint draft of the MVC extension has been approved as of January 2012.

In this disclosure, the phrase "multiview video coding" when fully written out refers generically to video coding in which multiple views exist. The acronym MVC may be used more specifically to refer to the H.264/AVC MVC extension or the MVC extension of HEVC (HEVC based MVC or MV-HEVC). Other multiview video coding techniques are described in the 3DV extension of HEVC (HEVC based 3DV or 3DV-HEVC).

The techniques described in this disclosure are applicable to multiview video coding, as well as scalable video coding. For example, the HEVC standard was recently finalized, and discussions are ongoing for extensions to the HEVC standard, as well as standards based on HEVC. For multiview video coding, extensions to the HEVC standard include MV-HEVC (multiview without depth) and 3D-HEVC (multiview with depth). Also the 3DV standard is based on the HEVC standard. For scalable video coding, extensions to the HEVC standard include SHVC. The techniques described in this disclosure are applicable to all of these standards, and generally applicable to any technique for video coding whether standards based or otherwise.

In multiview video coding, there exists a plurality of different views that each include a plurality of pictures. One of the views is referred to as a base view, and the other views are referred to as dependent views. Video encoder 20 or video decoder 30 may utilize a picture in a base view to inter-predict a picture in a dependent view, but video encoder 20 or video decoder 30 may not utilize a picture in a dependent view to inter-predict a picture in a base view. Video encoder 20 or video decoder 30 may utilize a picture in a dependent view to inter-predict a picture in another dependent view. In other words, video encoder 20 or video decoder 30 may not inter-predict pictures in a base view with pictures in another view, but may inter-predict pictures in a dependent view with pictures in other views (i.e., base view or other dependent views). When a picture is inter-predicted with a picture in another view, the picture in the other view is referred to as an inter-view reference picture.

It should be understood that video encoder 20 or video decoder 30 may inter-predict a picture in a base view with another picture in the base view, and similarly, video encoder 20 or video decoder 30 may inter-predict a picture in a dependent view with another picture in the same dependent view. In these cases, because the picture used for inter-prediction is in same view as the picture being inter-predicted, the picture used for inter-prediction is not an inter-view reference picture.

In scalable view coding, there exists a plurality of layers. One of the layers is referred to as a base layer, and the other layers are referred to as enhancement layers. Similar to multiview video coding, video encoder 20 or video decoder 30 may utilize a picture in the base layer to inter-predict a picture in an enhancement layer, but video encoder 20 or video decoder 30 may not utilize a picture in an enhancement layer to inter-predict a picture in a base layer. Video encoder 20 or video decoder 30 may utilize a picture in an enhancement layer to inter-picture a picture in another enhancement layer so long as the picture being inter-predicted is at a higher layer than the picture used for inter-prediction. In other words, scalable video coding may be considered as a hierarchical coding scheme in which pictures from higher layers can be inter-predicted with pictures from lower layers, but pictures from lower layers cannot be inter-predicted with picture from higher layers. However, in some cases, pictures from lower layers can be inter-predicted with pictures from higher layers. The base layer is the lowest layer, and therefore no picture in a higher layer can be used to inter-predict a picture in the base layer. When a picture is inter-predicted with a picture in another layer, the picture in the other layer is referred to as an inter-layer reference picture.

Similar to multiview video coding, it should be understood that video encoder 20 or video decoder 30 may inter-predict a picture in a base layer with another picture in the base layer, and similarly, video encoder 20 or video decoder 30 may inter-predict a picture in an enhancement layer with another picture in the same enhancement layer. In these cases, because the picture used for inter-prediction is in same layer as the picture being inter-predicted, the picture used for inter-prediction is not an inter-layer reference picture.

Figure 2:
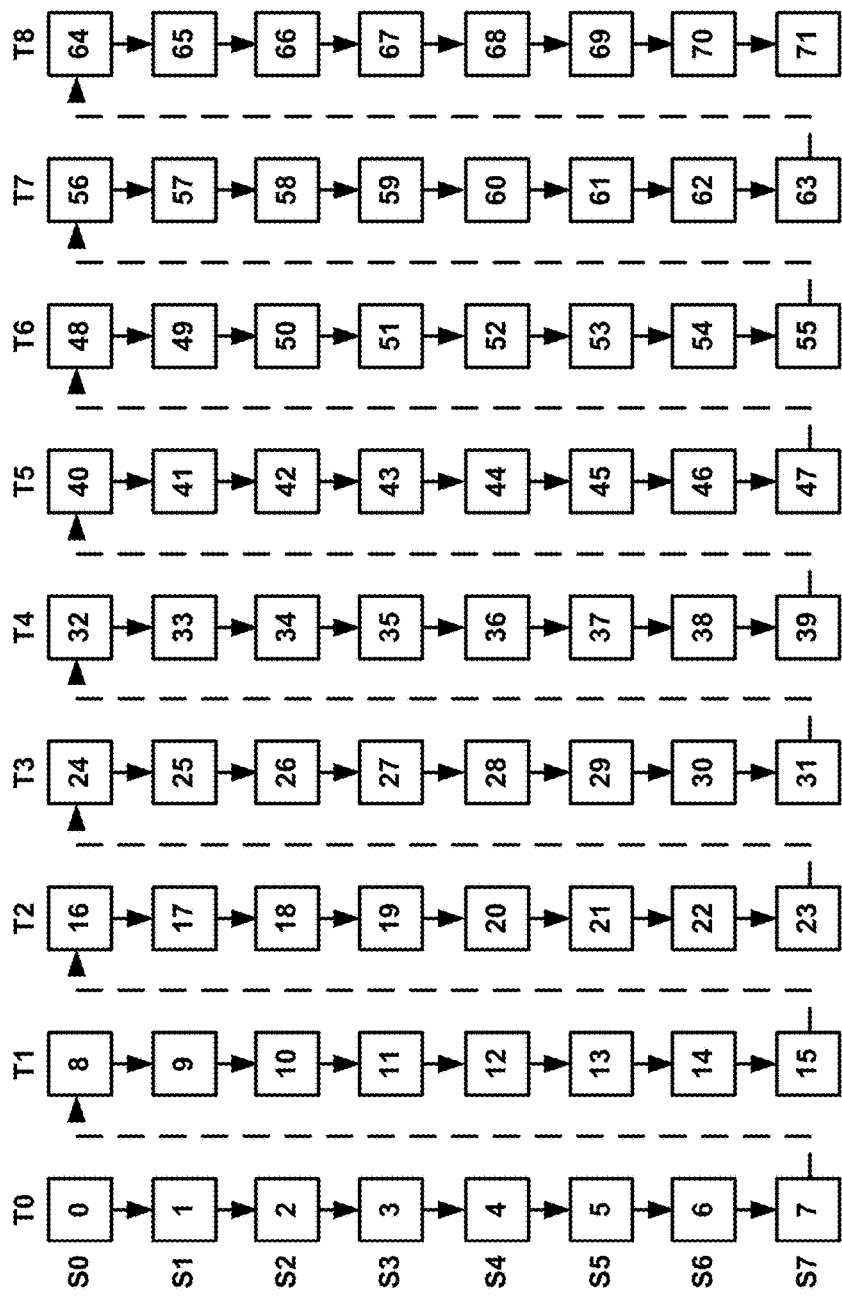
FIG. 2 is a graphical diagram illustrating an example multiview video coding (MVC) decoding order.

FIG. 2 is a graphical diagram illustrating an example multiview video coding (MVC) decoding order. FIG. 2 illustrates an MVC bitstream structure. For example, a typical MVC decoding order (i.e. bitstream order) is shown in FIG. 2. The decoding order arrangement is referred to as time-first coding. Each access unit is defined to contain the coded pictures of all the views for one output time instance. It should be understood that the decoding order illustrated in FIG. 2 may not be the same as the output or display order.

In FIG. 2, S0-S7 each refers to different views of the multiview video. T0-T8 each represents one output time instance. An access unit may include the coded pictures of all the views for one output time instance. For example, a first access unit includes all of the views S0-S7 for time instance T0 (i.e., pictures 0-7), a second access unit includes all of the views S0-S7 for time instance T1 (i.e. pictures 8-15), and so forth.

In FIG. 2, each of the views includes sets of pictures. For example, view S0 includes set of pictures 0, 8, 16, 24, 32, 40, 48, 56, and 64, view S1 includes set of pictures 1, 9, 17, 25, 33, 41, 49, 57, and 65, and so forth. In some examples, each picture of a view includes two components: one component is referred to as a texture view component, and the other component is referred to as a depth view component. The texture view component and the depth view component within a view may be considered as corresponding to one another. For example, the texture view component of a view can be considered as corresponding to a depth view component of the view, and vice-versa (i.e., the depth view component corresponds to its texture view component in the set, and vice-versa). As used in this disclosure, a texture view component and a depth view component that correspond may be considered to be part of a same view of a single access unit.

The texture view component includes the actual image content that is displayed. For example, the texture view component may include luma (Y) and chroma (Cb and Cr) components. The depth view component may indicate relative depths of the pixels in its corresponding texture view component. As one example, the depth view component may be similar to a gray scale image that includes only luma values. In other words, the depth view component may not convey any image content, but rather provide a measure of the relative depths of the pixels in the texture view component.

For example, the pixel values for the pixels in the depth view component may range from 0-255 (e.g., an 8 bit value). In some examples, smaller pixel values may indicate that a pixel is closer from the perspective of the viewer, and larger pixel values may indicate that a pixel is further away from the perspective of the viewer. Also, this 8 bit value may map to a grayscale. For instance, smaller pixel values map to light pixels, where a zero value maps to purely white pixel, larger pixel values map to dark pixels, where a value of 255 maps to a black pixel, and pixel values in the middle map to different gray levels. Accordingly, pixel values indicative of the depth of a pixel may require only luma components (e.g., an 8-bit value that maps to a gray scale).

The depth view component using only luma values (e.g., intensity values) to identify depth is provided for illustration purposes and should not be considered limiting. In some examples, any technique may be utilized to indicate relative depths of the pixels in the texture view component.

The depth view component may not be necessary in every example. For instance, in some examples of multiview video coding, no depth view component exists. In these examples, the texture view component and the picture may be synonymous.

In accordance with multiview video coding, the texture view components are inter-predicted from texture view components in the same view or from texture view components in one or more different views. The texture view components may be coded in blocks of video data, which are referred to as "video blocks" and commonly called "macroblocks" in the H.264 context. Other video coding standards, such as the HEVC standard, may refer to video blocks as treeblocks or coding units (CUs).

Figure 4:
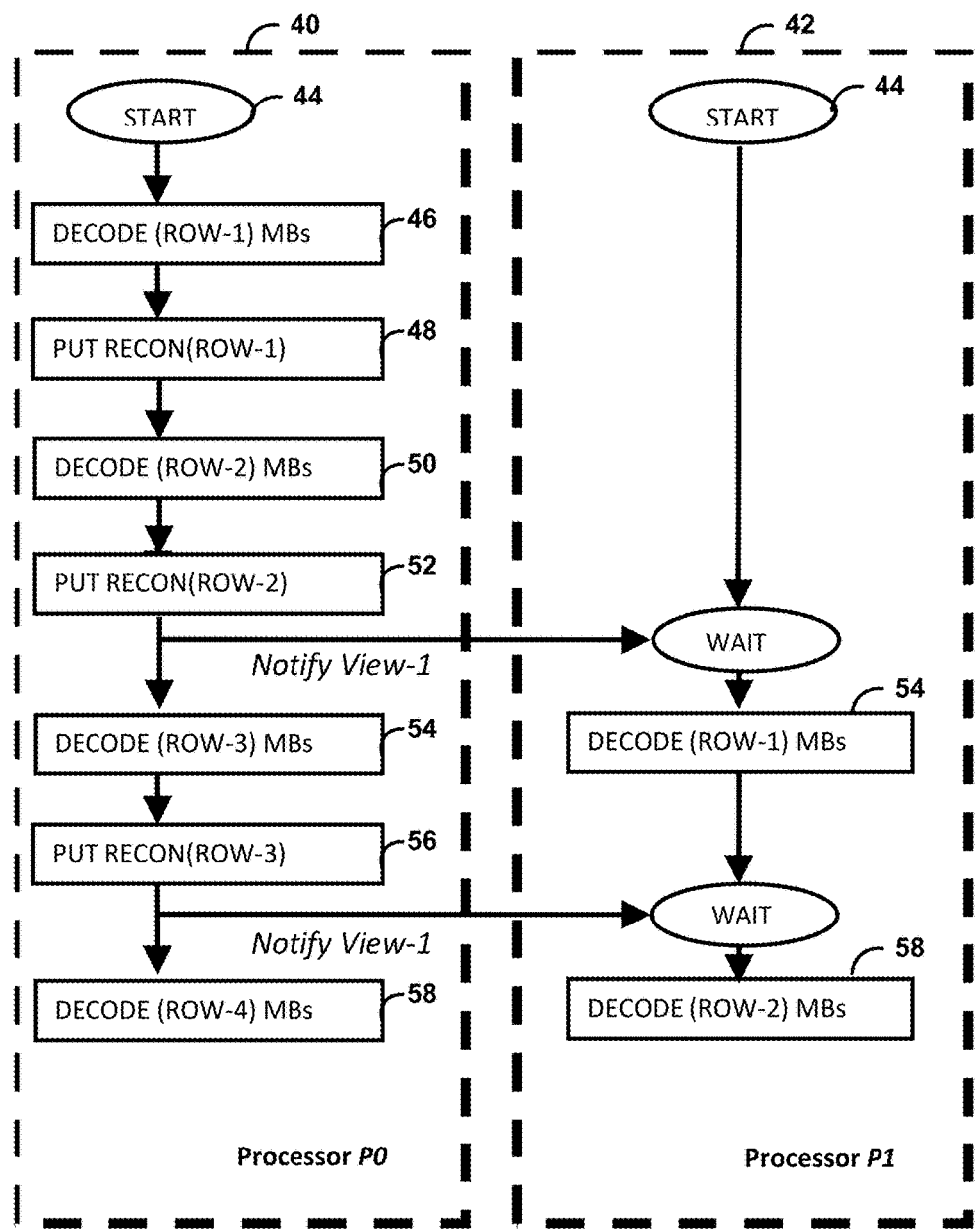
FIG. 4 is a flow diagram illustrating an example of parallel coding process for two views.

Although FIG. 2 illustrates an example of a time-first coding, in some examples, it may be possible for pictures to be encoded or decoded in parallel, as described in more detail with respect to FIG. 4. For example, the first picture of view S1 (e.g., the texture view component, and possibly the depth view component) may be inter-predicted with the first picture of view S0. For instance, a block in the first picture of view S1 may use a block in the first picture of view S0 as a predictor block, where a motion vector for the block in the first picture of view S1 refers to the predictor block in the first picture of view S0. In this sense, the first picture in view S0 may be a reference picture for the first picture in view S1 for inter-prediction purposes.

In some cases, to inter-predict blocks in the first picture of view S1 with blocks in the first picture of view S0, video decoder 30 may fully reconstruct the first picture of view S0 (i.e., fully decode the first picture of view S0) before beginning to reconstruct the first picture of view S1 (i.e., before decoding the first picture of view S1). In parallel decoding, video decoder 30 may begin decoding the first picture of view S1 in parallel with the decoding of the first picture of view S0.

In general, parallel decoding is based on the concept of motion vector restriction. Motion vector restriction refers to a restriction on at least one of an x-component or y-component (and possibly both) of a motion vector for a block. As one example, the motion vector restriction may define a range for the motion vector component(s).

Any block in the reference picture that is outside of the defined range of the motion vector component(s) cannot be used to inter-predict the current block. As an example, the motion vector restriction may define a y-component threshold value (Th). In this example, the y-component of a motion vector for any block in a current picture cannot be greater than Th. This means that any block in the reference picture whose vertical distance is more than Th, relative to a block in the current picture, cannot be used to inter-predict that block in the current picture.

As described in more detail, the techniques described in this disclosure may ensure that derived motion vectors for blocks are compliant with the motion vector restriction. For example, video encoder 20 may generate for output a bitstream that includes information that defines the manner in which video decoder 30 derives the motion vector for a current block. The techniques may constrain the information that video encoder 20 can generate for output in the bitstream so that when video decoder 30 derives the motion vector for the current block based on the information in the bitstream, video decoder 30 does not derive a motion vector that violates the motion vector restriction. In other words, the bitstream is constrained such that the information ensures that the derived motion vector is compliant with a motion vector restriction.

Moreover, as described in more detail, the bitstream generated for output by video encoder 20 may include information that specifies the parallel decoding delay in units that video decoder 30 can utilize for purposes of determining when to begin the parallel decoding of a picture without needing to further convert the received values. For instance, video decoder 30 may not be able to determine when to begin the parallel decoding of a picture if the parallel decoding delay is in units of rows because the hierarchical structure of the HEVC video coding techniques do not necessarily correspond to rows. As described in more detail, video encoder 20 may signal information indicating the parallel decoding delay based on coding unit sizes (e.g., LCU size, smallest coding unit (SCU) size) or a fixed size.

Figure 3:
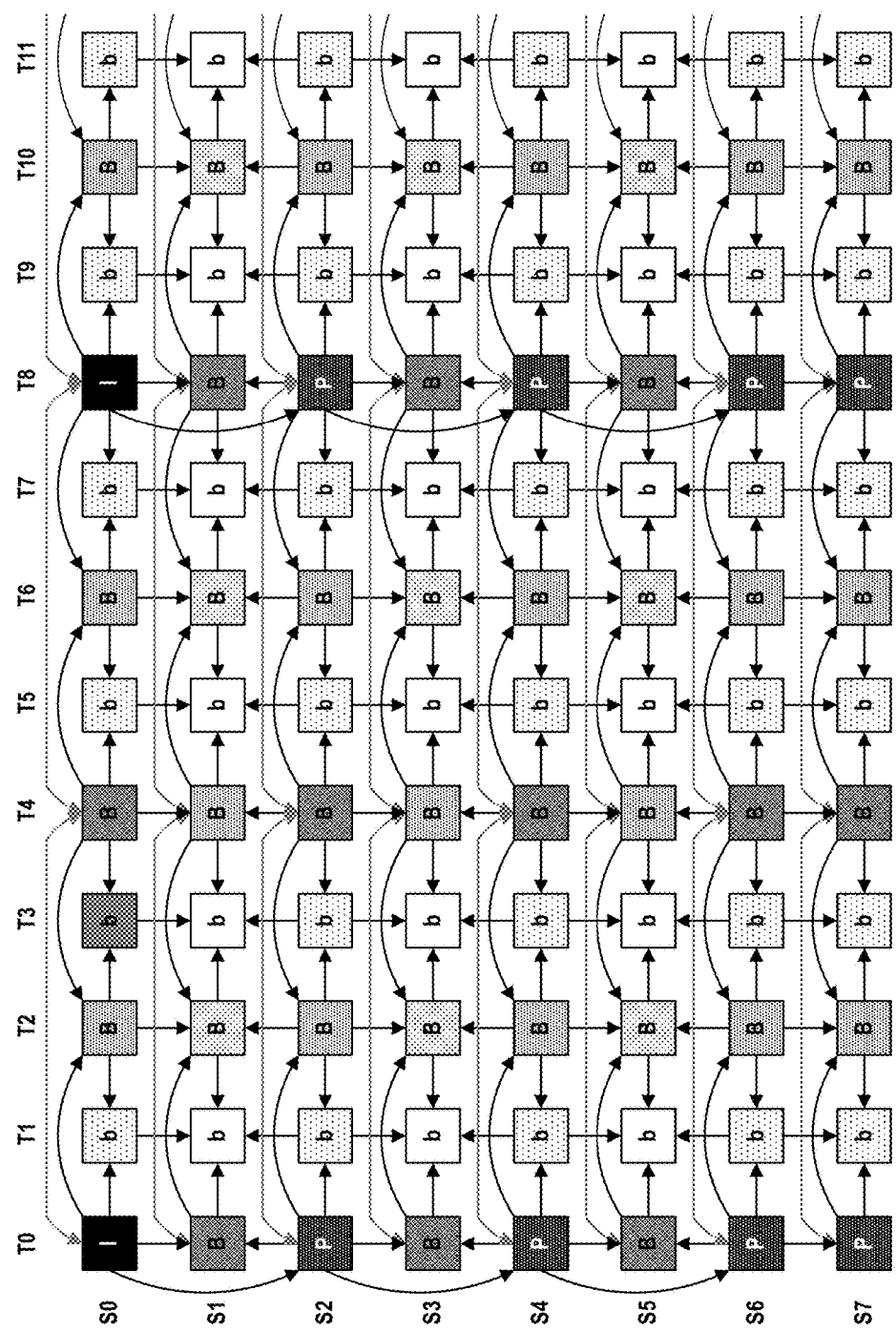
FIG. 3 is a conceptual diagram illustrating a structure for multi-view video coding.

FIG. 3 is a conceptual diagram illustrating a structure for multi-view video coding. FIG. 3 illustrates a multiview video coding structure. For example, a typical multiview video coding prediction (including both inter-picture prediction within each view and inter-view prediction) structure for multi-view video coding is shown in FIG. 3, where predictions are indicated by arrows, the pointed-to object using the point-from object for prediction reference. In multiview video coding, the inter-view prediction is supported by disparity motion compensation, which uses the syntax of the H.264/AVC motion compensation, but allows a picture in a different view to be used as a reference picture.

Coding of two views could be supported also by multi-view video coding, and one of the advantages of multiview video coding is that video encoder 20 could take more than two views as a 3D video input and video decoder 30 can decode such a multiview representation. Accordingly, any renderer with a video decoder like video decoder 30 may expect 3D video content with more than two views In multiview video coding, inter-view prediction is allowed among pictures in the same access unit (i.e., with the same time instance). When coding a picture in one of the non-base views, a picture may be added into a reference picture list, if it is in a different view but with a same time instance. An inter-view prediction reference picture can be put in any position of a reference picture list, just like any inter-prediction reference picture. When inter-view prediction reference picture is used for motion compensation, the corresponding motion vector is referred to as "Disparity Motion Vector."

In FIG. 3, view S0 may be considered as a base view and the other views (S1-S7) may be considered as dependent views. For example, view S0 may be a base view because no picture in view S0 is inter-view predicted with a picture in another view. However, pictures in view S0 may be inter-predicted with other pictures in view S0. The other views may be dependent views because at least one picture in these other views is inter-view predicted. For example, the first picture in view S1 is inter-view predicted with the first picture in view S0 and the first picture in view S2. It should be understood that some pictures in dependent views may be inter-predicted with other pictures in the same view.

For example, the term "inter-prediction" refers to a case where a block in a current picture is predicted based on a block in a reference picture (e.g., a predictor block in a reference picture). A motion vector for the block in the current picture refers to the block in the reference picture. In multiview video coding, the reference picture may be a picture in the same view as the current picture or a picture in another view. If the reference picture is in another view, then the reference picture and the current picture are in the same access unit. For instance, as described above, an access unit includes pictures of different views for the same time instance, and a reference picture in another view may be required to be in the same access unit as the current picture.

When the reference picture is in another view than the current picture, the motion vector that refers to the reference picture in the other view is referred to as a disparity motion vector. Also, when the reference picture is in another view than the current picture, the block in the current picture may be referred to as being inter-view predicted. In other words, in inter-view prediction, a block in a current picture is inter-view predicted with a disparity motion vector that refers to a block in a reference picture that is in a view other than the view that includes the current picture.

To perform inter-prediction (i.e., inter-view prediction or inter-prediction with a picture in the same view), video encoder 20 and video decoder 30 may construct one or two reference picture lists (referred to as RefPicList0 and RefPicList1). Video encoder 20 and video decoder 30 may utilize pictures identified in the reference picture lists for inter-prediction purposes. In the techniques described in this disclosure, an inter-view reference picture (i.e., a reference picture in a view other than the view of the current picture being encoded or decoded) may be inserted at any location within the reference picture list(s). After video encoder 20 and video decoder 30 construct the reference picture lists (i.e., construct RefPicList0 and RefPicList1), a reference index into a reference picture list may identify any reference picture included in the reference picture list.

For instance, for a bi-predicted picture (B picture), video encoder 20 may signal an index into RefPicList0 and an index into RefPicList1 that identifies the reference pictures used to encode the bi-predicted picture. Video decoder 30 may utilize the index to determine the reference pictures that needed (one from RefPicList0 and one from RefPicList1) to decode (e.g., reconstruct) the current picture. For a unidirectionally predicting picture (P picture), video encoder 20 may signal an index into one of RefPicList0 or RefPicList1 or only into RefPicList0 (in which case video decoder 30 may not construct RefPicList1) that identifies the reference picture used to encode the uni-directionally predicted picture. Video decoder 30 may utilize the index to determine the reference picture needed to decode (e.g., reconstruct) the current picture.

Typically a reference picture list construction for the first or the second reference picture list of a B picture (bi-predicted picture) includes two steps: reference picture list initialization and reference picture list reordering (modification). The reference picture list initialization is an explicit mechanism that puts the reference pictures in the reference picture memory (also known as decoded picture buffer (DPB)) into a list based on the order of POC (Picture Order Count, aligned with display order of a picture) values. The reference picture list reordering mechanism can modify the position of a picture that was put in the list during the reference picture list initialization to any new position, or put any reference picture in the reference picture memory in any position even the picture does not belong to the initialized list. Some pictures after the reference picture list reordering (modification) may be put in a very further position in the list. However, if a position of a picture exceeds the number of active reference pictures of the list, the picture is not considered as an entry of the final reference picture list. The number of active reference pictures of may be signaled in the slice header for each list.

FIG. 4 is a flow diagram illustrating an example of parallel coding process for two views. FIG. 4 illustrates a parallel coding (e.g., decoding) information of supplemental enhancement information (SEI). In the MVC extension of H.264/AVC, there is an SEI message supporting parallel decoding. For each view component, when decoding one macroblock, it is considered that there is at least two macroblock (MB) rows delays between two the current view and a reference view. The additional delay in the unit of addition MB rows is signaled in the SEI message, for each view and each of its reference view. An example of the usage of this SEI message is shown in FIG. 4.

FIG. 4 illustrates decoding of picture 40 of a first view (view 0) in parallel with decoding of picture 42 of a second view (view 1). In this example, picture 40 is a reference picture to picture 42 (i.e., blocks of picture 40 are used to inter-predict, and particularly inter-view predict blocks of picture 42). Also, FIG. 4 illustrates picture 40 being decoded by processor P0 and picture 42 being decoded by processor P1. The reference to processors P0 and P1 is to illustrate processing algorithms that performed to decode picture 40 and picture 42. Processors P0 and P1 may be part of video decoder 30. In other words, FIG. 4 illustrates an example of video decoder 30 decoding pictures 40 and 42 in parallel.

At time 44, video decoder 30 starts the decoding process, but for picture 42 there is a delay before video decoder 30 starts decoding the first row of picture 42. For example, in FIG. 4 the parallel decoding delay is two rows of macroblocks. As described above, some techniques may require at least a decoding delay of two rows. Video encoder 20 may signal the exact decoding delay to video decoder 30 in an SEI message.

At time 46, video decoder 30 decodes the first row of macroblocks of picture 40 to reconstruct the first row of macroblocks of picture 40. At time 48, video decoder 30 stores the reconstructed first row of macroblocks of picture 40 in a decoded picture buffer (DPB) of video decoder 30. At time 50, video decoder 30 decodes the second row to reconstruct the second row of macroblocks of picture 40. At time 52, video decoder 30 stores the reconstructed second row of macroblocks of picture 40 in the DPB of video decoder 30. Also, at time 52, video decoder 30 determines that parallel decoding of picture 42 can begin. For instance, the first processing algorithm (processor P0) notifies the second processing algorithm (processor P1) that parallel decoding of picture 42 can begin (e.g., by sending a control signal "notify view-1" to processor P1).

At time 54, video decoder 30 decodes the third row of picture 40 to reconstruct the third row of picture 40, and in parallel (e.g., at the same time) decodes the first row of picture 42 to reconstruct the first row of picture 42. At time 56, video decoder 30 stores the reconstructed third row of picture 40 in the DPB. Although not illustrated, video decoder 30 may also store the reconstructed first row of picture 42 in the DPB.

Also, at time 56, processor P0 notifies processor P1 that decoding of the next row of picture 42 can begin. At time 58, video decoder 30 decodes the fourth row of picture 40 to reconstruct the fourth row of picture 40, and in parallel (e.g., at the same time) decodes the second row of picture 42 to reconstruct the second row of picture 42. Video decoder 30 repeats these steps to reconstruct picture 40 and picture 42. In this way, video decoder 30 may implement parallel decoding of two pictures from different views where one picture from a view (e.g., picture 40 of view 0) is a reference picture for another picture from another view (e.g., picture 42 of view 1).

Motion vector restriction facilitates the parallel decoding in some examples. In the example illustrated in FIG. 4, the motion vectors for blocks in picture 42 may be restricted such that the y-component of the motion vectors for blocks in picture 42 cannot be greater than a distance of one row. As one example, in FIG. 4, video decoder 30 begins decoding the first row of picture 42 in parallel with the decoding of the third row of picture 40 (i.e., video decoder 30 has to wait before two rows of picture 40 are reconstructed before decoding the first row of picture 42). In this example, if a motion vector for a block in first row of picture 42 referred to a block that is after the second row of picture 40, there may be decoding errors because video decoder 30 may not have yet decoded that row of picture 40. With motion vector restriction, video encoder 20 may not signal motion vector values to video decoder 30 for blocks of picture 42 where the y-component of the block is greater than a distance of one row.

In the example illustrated in FIG. 4, the motion vector restriction may be one row for the y-component of the motion vectors for picture 42. In this way, after video decoder 30 reconstructs the second row of picture 40, video decoder 30 may be able to begin decoding picture 42 because the blocks in picture 42 will not refer to any block in the reference picture whose vertical distance is more than one row away from the block. Accordingly, the motion vector restriction may be considered as indicative of parallel decoding delay. As described in more detail below, in some examples, based on filtering performed by video decoder 30, video decoder 30 may need to reconstruct additional rows of the reference picture (e.g., picture 40) before beginning to reconstruct the current picture (e.g., picture 42).

In the above example of FIG. 4, video encoder 20 and video decoder 30 may function in accordance with the MVC extension to H.264/AVC. However, when techniques related to motion vector restriction and parallel decoding delays are extended to HEVC based video coding techniques, there may be certain issues. For example, there may be certain issues with implementing motion vector restriction when the reference picture is in a different view, and there may be certain issues with utilizing techniques for indicating parallel decoding delay with the HEVC coding structure. Furthermore, although the above examples are described for multiview video coding, the techniques described in this disclosure may be extended to scalable video coding as well, including scalable extension of HEVC (e.g., SHVC).

In scalable video coding (SVC), there could be multiple layers. The layer at the very bottom level may just serve as a base layer (BL) and the layer at the very top level just as an enhancement layer (EL). All the layers in the middle may serve as both EL and BL. For example, a layer in the middle can be an EL for the layers below it, and at the same time as a BL for the layers above it. For simplicity of description, the disclosure assumes that there are two layers, a BL and an EL, in illustrating the current techniques. It should be noted that the techniques described in this disclosure are applicable to cases with multiple layers too.

For example, the above examples described the concept of inter-view prediction in which a current block of a picture from a dependent view is inter-predicted with a reference picture in another view (e.g., a base view). In some examples, in inter-layer prediction, a current block of a picture from an enhancement layer is inter-predicted with a reference picture in another layer (e.g., a base layer). In the techniques described in this disclosure, motion vector restriction and parallel decoding may be utilized for scalable video coding techniques as well. For instance, there may be motion vector restriction for blocks of enhancement layer pictures that refer to inter-layer pictures (e.g., base layer pictures). Also, it may be possible to parallel decode two layers, where one layer uses the other layer for inter-prediction purposes (e.g., inter-layer prediction purposes) in a manner similar to that described above with respect to FIG. 4.

As described above, for multiview video coding, there are ongoing discussions for different HEVC-based multiview video coding extensions. One example is the 3DV extension to HEVC and another example is the MV extension to HEVC. For instance, MPEG is developing a 3DV and MV standard based on HEVC, for which part of the standardization efforts also includes the standardization of the multiview video codec based on HEVC. In HEVC based 3DV and MV, inter-view prediction based on the reconstructed view components from different views is enabled.

One of the differences between the HEVC-based 3DV and HEVC-based MV is the high level syntax only (HLS-only) requirement. For example, in AVC, multiview extension was done in a way that the extension actually fulfills the "HLS-only" requirement. The "HLS-only" requirement guarantees there is only high-level syntax (HLS) changes in the Multiview Video Coding (MVC), such that no module in the macroblock level in AVC needs to be re-designed and can be fully reused for MVC.

This HLS-only requirement is extended to MV-HEVC, but not 3DV-HEVC. For instance, one requirement of MV-HEVC standard may be that MV-HEVC fulfills the HLS-only requirement relative to the HEVC standard. The 3DV-HEVC standard may not require HLS-only changes. Although 3DV-HEVC does not require HLS-only changes, if HLS-only changes are made relative to the HEVC standard, the resulting may still be compliant with 3DV-HEVC. In other words, it is possible that the "HLS-only" requirement may be fulfilled for an MVC/3DV extension of HEVC, and also for Scalable Video Coding (SVC) extension of HEVC (SHVC), if multi-loop decoding is considered as acceptable.

To enable inter-view prediction, the minimum and potentially, although not necessarily, HLS changes are for the following purpose of picture identification, where the reference picture list construction and marking need to be able to identify a picture in a specific view. For example, for multiview video coding, one or both of the reference picture lists (RefPicList0 and RefPicList1) may include an inter-view picture (i.e., a picture not in the same view as the picture being encoded or decoded) or an inter-layer picture (i.e., a picture not in the same layer as the picture being encoded or decoded).

If the HLS changes are not sufficient to fulfill the "HLS-only" requirement in H.264/MVC, then other constraints, assumptions are made, so that the low-level coding modules may never encounter a situation of needing to implement functions that the low-level coding modules of HEVC were not configured for (e.g., handling zero motion related scaling). Such constraints, modifications and assumptions are: (1) Disabling temporal direct mode if a co-located picture is an inter-view (only) reference picture, (2) Considering an inter-view (only) reference picture as not a short-term: related to spatial direct, and Disabling implicit weighted prediction.

One example of HLS only HEVC extension is MV-HEVC, and the latest working draft of MV-HEVC is JCT3V-B1004, "MV-HEVC Draft Text 2," G. Tech, K. Wegner, Y. Chen, M. Hannuksela, available at http://phenix.it-sudparis.eu/jct2/doc_end_user/documents/2_Shanghai/wg11/JCT3V-B1004-v1.zip, the entire contents of which are incorporated by reference herein.

This disclosure also refers to JCT3V-B0037, entitled "MV-HEVC: Vertical length restriction of inter-view vector for HEVC simple 3D extension," by Nakagami et al. and available from http://phenix.it-sudparis.eu/jct2/doc_end_user/current_document.php?id=225, the contents of which are incorporated by reference in their entirety. In JCT3V-B0037, it was suggested to restrict the motion vector pointing in MV-HEVC to the base view reference frame in vertical direction to ease memory bandwidth requirements and make decoder more parallel friendly. This restriction is suggested to be indicated by a flag signaled in SPS

```
if ( profile_idc == "Multi-view support Profile" )
{
    interview_vector_v_restrict_flag                    u(1)
  if ( interview_vector_v_restrict_flag == 1 ) {
    max_interview_vector_v_length_div4                  u(4)
  }
}
```

Although motion vector restriction is described above with respect to parallel decoding, motion vector restriction may be useful for other additional, independent reasons. In other words, in some examples, even if video decoder 30 is not configured to implement parallel decoding, motion vector restriction may be useful or desirable.

As one example, motion vector restriction may be useful for memory bandwidth reduction (e.g., reducing memory accesses and/or the amount of data that needs to be accessed). For instance, with motion vector restriction, the amount of data that video encoder 20 or video decoder 30 needs to access from the reference picture may be reduced for encoding or decoding the current picture. Memory bandwidth can be estimated based on the number of accessed pixels from the reference pictures per predicted pixels. For example, memory bandwidth is lower with the reduction of the number of pixel that are accessed in a reference picture. In many use cases, memory bandwidth may be considered as a bottleneck, and memory bandwidth reduction for the worst case can be considered as an advantage. For instance, the techniques may simplify, reduce, or eliminate memory accesses relative to other techniques.

For example, when the vertical component of a motion vector that refers to a picture in another view is constrained, the memory bandwidth required by accessing pixels of the reference view picture might be reduced. As one example, if the vertical component (i.e., y-component of the motion vector) is restricted to be a smaller value, there may be no need to access any pixel in vertical direction outside of the block for interpolation purpose.

For instance, a motion vector for a block may not refer to an integer pixel in the reference picture, but instead to a sub-integer pixel (referred to as a pel). Video encoder 20 and video decoder 30 generate these sub-integer pixels or pels by interpolating pixel values of neighboring integer pixels in the reference picture. For example, video encoder 20 and video decoder 30 access pixel values for the reference picture, including pixel values for pixels that extend outside of the block referred to by the motion vector, from the DPB for interpolating the sub-integer pixels. With motion vector restriction, video encoder 20 and video decoder 30 may not need to access pixel values for pixels that reside outside of the area to which the motion vectors are restricted for interpolation, which reduces the amount of data that video encoder 20 and video decoder 30 need to retrieve from respective DPBs and thereby promotes memory bandwidth reduction.

However, to ensure that motion vectors do not violate the motion vector restriction, additional aspects may need to be accounted for. For example, video encoder 20 may not signal the x- and y-components of the motion vector for a block that video decoder 30 uses to determine the motion vector for the block. Rather, video encoder 20 may signal information that video decoder 30 uses to derive the motion vector.

For example, video decoder 30 may derive a motion vector for the current block based on a motion vector predictor as part of merge/skip mode and advanced motion vector prediction (AMVP) mode. In merge/skip mode and AMVP mode, video encoder 20 may not signal the motion vector for the current block, but may instead signal an index into a list of candidate motion vector predictors. Video decoder 30 may derive the motion vector for the current block from the motion vector predictor identified by the index into the list of candidate motion vector predictors.

For example, in merge/skip mode and AMVP mode, video encoder 20 and video decoder 30 each construct a list of candidate motion vector predictors. Video encoder 20 and video decoder 30 may implement substantially similar techniques to construct respective lists of candidate motion vector predictors such that the candidate motion vector predictors identified in the list are the same for both video encoder 20 and video decoder 30.

In merge/skip mode and AMVP mode, video encoder 20 and video decoder 30 construct the list of candidate motion vector predictors based on motion information of neighboring blocks. Examples of the neighboring blocks include spatial neighboring blocks and temporal neighboring blocks. Spatial neighboring blocks refer to blocks that neighbor the current block and are in the same picture as the current block. Temporal neighboring blocks refer to blocks that neighbor the current block, but are in another picture. The motion vectors for spatial neighboring blocks that may be motion vector predictors for the current block are referred to as spatial motion vector predictors (SMVPs). The motion vectors for temporal neighboring blocks that may be motion vector predictors for the current block are referred to as temporal motion vector predictors (TMVPs).

For both merge/skip mode or AMVP mode, video encoder 20 signals an index into the list of candidate motion vector predictors that video decoder 30 receives. Video decoder 30 then identifies the motion information (e.g., reference pictures and motion vector or vectors) from the signaled index into the list of candidate motion vector predictors, and determines the motion vector for the current block based on the identified motion information.

For example, in merge/skip mode, video decoder 30 receives an index into the list of candidate motion vector predictors and identifies motion information stored in the list of candidate motion vector predictors based on the signaled index. Video decoder 30 determines the reference picture list, the reference index, and the motion vector from the identified motion information. Video decoder 30 then adopts the determined reference picture list, the reference index, and the motion vector from the identified motion information as the motion information for the current block. In other words, the current block inherits the motion information of the block identified by the index into the list of candidate motion vector predictors. In this way, video decoder 30 derives the motion vector for the current block based on the motion vector predictor (e.g., video decoder 30 sets the motion vector for the current block equal to the motion vector predictor).

In some examples, in merge/skip mode, if the block identified by the index into the list of candidate motion vector predictors refers to a temporal neighboring block, video decoder 30 may not adopt the motion information associated with this motion vector candidate. Video decoder 30 may utilize any known technique or any technique that is to be developed to determine the reference index into the reference picture list (e.g., select index zero into one or both of the reference picture lists). In this disclosure, there may be certain constraints on the reference picture lists such as when a default index (e.g., index zero) is used as the reference index into the reference picture list when the motion vector for a temporal neighboring block is used as the motion vector predictor.

In this way, video decoder 30 may determine the motion information for the current block in merge/skip mode. In merge mode, video decoder 30 may also receive residual data between the current block and the block referred to by the determined motion information, and video decoder 30 may utilize the residual data to determine the pixel values of the current block. In skip mode, video decoder 30 may not receive residual data between the current block and the block referred to by the determined motion information. In this example, video decoder 30 may assume the residual data to be zero (i.e., set the pixel values of the current block to be equal to those of the block referred to by the determined motion information).

AMVP mode may be similar to merge/skip mode; however, in addition to receiving an index to the list of candidate motion vector predictors, video decoder 30 may also receive a reference index value(s) for reference picture list(s) from video encoder 20 and motion vector difference(s). The motion vector difference (MVD) may be the difference in the motion vector between the motion vector of the block identified by the index into the list of candidate motion vector predictors and another motion vector (e.g., a motion vector found by video encoder 20 based on a best-match search).

For example, video decoder 30 may determine the motion vector of the block identified by the index into the list of candidate motion vector predictors. Video decoder 30 may add or subtract the value of the motion vector of the block identified by the index into the list of candidate motion vector predictors with the signaled motion vector difference to determine the motion vector for the current block. In addition, video decoder 30 may determine the reference picture to which the determined motion vector refers based on the signaled information indicating the reference picture list and the signaled index into that reference picture list. In this way, video decoder 30 may determine the motion information for the current block in AMVP mode.

As described above, for merge/skip mode and AMVP mode, video encoder 20 and video decoder 30 construct a list of candidate motion vector predictors. The following describes example ways in which to construct a list of candidate motion vector predictors. In some examples, video encoder 20 and video decoder 30 may scale the motion vector information of the temporal neighboring block based on the picture order count (POC) value if the motion information of a temporal neighboring block is to be included in the list of candidate motion vector predictors.

The following provides some description regarding the way in which video encoder 20 and video decoder 30 may determine which temporal motion vector predictors to include in the list of candidate motion vector predictors. To get a Temporal Motion Vector Predictor (TMVP), video encoder 20 and video decoder 30 may first identify a co-located picture. If the current picture is a B slice (e.g., bi-predicted slice), video encoder 20 may signal a collocated_from_l0_flag in a slice header to indicate which reference picture list the co-located picture is from (e.g., whether the co-located picture is from RefPicList0 or RefPicList1). Video decoder 30 may determine which reference picture the co-located picture is from based on the collocated_from_l0_flag signaled in the slice header.

After a reference picture list is identified, video encoder 20 may signal the collocated_ref_idx syntax element in slice header is to identify the picture in the identified reference picture list. The collocated_ref_idx syntax element is one example of information that video encoder 20 may signal in the bitstream. Video decoder 30 may identify the picture in the identified reference picture list based on the collocated_ref_idx syntax element, where the collocated_ref_idx syntax element is one example of information in the bitstream that video decoder 30 receives.

Video encoder 20 and video decoder 30 may identify a co-located prediction unit (PU) by checking the co-located picture. The co-located PU may be either the right-bottom PU of the co-located region (e.g., the BR block), or the so-called 'center 3' or CR block (i.e., the right-bottom PU of the center of the co-located region).

Suppose a luma location (xP, yP) specifies the top-left sample of the current luma prediction block relative to the top-left luma sample of the current picture and variables nPbW and nPbH specify the width and the height of the luma prediction block, respectively, the BR block and center 3 or CR block may be defined as follows:

right-bottom PU of the co-located region:

$xPRb=xP+nPbW$ $yPRb=yP+nPbH$

If (yP>>Log 2CtbSizeY) is equal to (yPRb>>Log 2CtbSizeY), and xPRb is less than pic_width_in_luma_samples, the following applies.

The co-located PU specifies the luma prediction block covering the modified location given by ((xPRb>>4)<<4, (yPRb>>4)<<4) inside the collocated picture specified by colPic.

Center 3:

$xPCtr=xP+(nPbW>>1)$ $yPCtr=yP+(nPbH>>1)$

The variable co-located PU specifies the luma prediction block covering the modified location given by ((xPCtr>>4)<<4, (yPCtr>>4)<<4) inside the colPic.

In some examples, when video encoder 20 and video decoder 30 identify motion vectors by the above process to generate a motion candidate for AMVP or merge/skip mode, video encoder 20 and video decoder 30 may scale the motion vector based on the temporal location (reflected by POC values). In HEVC, the sequence parameter set (SPS) includes a flag sps_temporal_mvp_enable_flag and the slice header includes a flag pic_temporal_mvp_enable_flag when sps_temporal_mvp_enable_g is equal to 1. When both pic_temporal_mvp_enable_flag and temporal_id are equal to 0 for a particular picture, no motion vector from pictures before that particular picture in decoding order would be used as a temporal motion vector predictor in decoding of the particular picture or a picture after the particular picture in decoding order.

When using motion vector restriction, there may be certain issues with ensuring the derived motion vector using a motion vector predictor in either merge/skip mode or AMVP mode is compliant with the motion vector restriction. For example, it may be possible that, in merge/skip mode, if the motion vector for the current block is set equal to the motion vector predictor, the motion vector for the current block violates the motion vector restriction. As another example, it may be possible that, in AMVP mode, if the motion vector predictor is added or subtracted from the motion vector difference, the resulting, derived motion vector violates the motion vector restriction. There may be other issues with using motion vector restriction that are described in more detail below.

Furthermore, when parallel decoding techniques are extended to HEVC based multiview video coding techniques, there may be certain issues. For instance, as described above, for the MVC extension of H.264/AVC, video encoder 20 signals parallel decoding delay information in an SEI message and the parallel decoded delay is at least two rows. However, due the hierarchical structure of coding units of HEVC based techniques, there is no straightforward extension from macroblock rows to block rows in MV-HEVC, 3DV-HEVC, or SHVC.

Also, in the techniques described in JCT3V-B0037, a video encoder may signal the vertical disparity motion vector range (i.e., the motion vector restriction for the y-component). However, it may not be straightforward for a video decoder to determine delay in LCU rows. The video decoder may need to calculate the LCU row delay based on the LCU size, as one example. In other words, a value of LCU rows may not be a value that video decoder 30 can utilize to determine when to begin parallel decoding a picture that uses the inter-view or inter-layer picture as a reference picture, and additional conversion of the value of LCU rows into values based on LCU size may be needed for video decoder 30 to determine when to begin parallel decoding of a picture. However, there may not uniform way of determining when to being parallel decoding of a picture in examples where the motion vector restriction is signaled in terms of LCU rows. Accordingly, different video decoders may begin parallel decoding at different times potentially causing decoding errors.

The following describes techniques in accordance with this disclosure. For example, various techniques proposed for the merge/skip mode and AMVP mode to address the above mentioned problems and related issues such as deriving a motion vector that violates the motion vector restriction. This disclosure also describes techniques for enhancing parallel decoding that addresses the above described limitations of relying on LCU rows for determining when to begin parallel decoding.

In particular, this disclosure first describes techniques related to memory bandwidth reduction when motion vector restriction is utilized. This disclosure then describes techniques related to supporting of parallel decoding. It should be understood that techniques described in this disclosure for memory bandwidth reduction when motion vector restriction is utilized may be independent from techniques described in this disclosure for parallel decoding. In other words, even if video decoder 30 is not configured for parallel decoding, video decoder 30 may still utilize the memory bandwidth reduction techniques described in this disclosure, and vice-versa.

As described above, one potential benefit of motion vector restriction is memory bandwidth reduction. For example, benefits of motion vector restriction may be realized in examples where the reference picture (i.e., the picture whose blocks are used to inter-predict blocks of a current picture) is an inter-view reference picture or an inter-layer reference picture; however, the techniques described in this disclosure are not so limited. For example, the motion vector restriction restricts a range of the motion vector to refer to a sub-portion (e.g., a portion less than the whole picture) of the inter-view or inter-layer reference picture. When the vertical disparity motion vector is constrained, the memory bandwidth required for accessing pixels of the picture may be reduced. In other words, if the range y-component of a motion vector that refers to a picture in another view (i.e., refers to an inter-view reference picture) is restricted, the amount of data that needs to be retrieved from the DPB that stores the inter-view reference picture may be reduced. For instance, if the range vertical component is restricted to a relatively small value, video encoder 20 and video decoder 30 may not needed to access pixel values of pixels of the inter-view reference picture stored in the DPB output of the block referred to by the motion vector for interpolation purposes. The same may be true if an inter-layer reference picture is used, rather than an inter-view reference picture.

For ease of description, the techniques described in this disclosure for memory bandwidth reduction with motion vector restriction are described with respect to examples where the reference picture is an inter-view or inter-layer reference picture. Furthermore, in some examples, for scalable video coding based on HEVC (SHVC), one or both components (horizontal and vertical) of the motion vector that refers to an inter-layer reference picture may always be restricted to zero. In some examples, for multiview video coding based on HEVC (MV-HEVC or 3DV-HEVC), motion vector restriction for a motion vector that refers to an inter-view reference picture may be selectable and the restriction range for the motion vector that refers to an inter-view reference picture may be selectable.

As described above, one of the issues of using motion vector restriction with inter-view or inter-layer reference pictures is that a motion vector derived from a motion vector predictor may violate the motion vector restriction. In accordance with the techniques described in this disclosure, the bitstream that video encoder 20 generates for output and that video decoder 30 receives (i.e., via link 16 or via storage device 34) may be constrained such that the derived motion vector for the current block does not violate the motion vector restriction. In other words, the bitstream is constrained such that the information ensures that the derived motion vector is compliant with a motion vector restriction.

For example, in the techniques described in this disclosure, the bitstream shall not include the motion vector or other syntaxes used to form (i.e., derive) the motion vector that will be used for motion compensation with inter-layer or inter-view reference picture by video decoder 30 that will cause the motion vector to not satisfy the motion vector restriction. In other words, the bitstream includes information for deriving a motion vector for a current block from a motion vector predictor, where the motion vector refers to an inter-view or inter-layer reference picture, and where the motion vector restriction restricts a range of the motion vector to refer to a sub-portion of the inter-view or inter-layer reference picture. For example, if one or both of the motion vector components (i.e., horizontal component or x-component and/or vertical component or y-component) are restricted to zero for motion compensation by video decoder 30, then the bitstream may not include motion vectors or syntaxes for deriving the motion vector that cause the horizontal and/or vertical components of the motion vector to be non-zero.

In this example, the range of the motion vector is restricted to zero, meaning that the derived motion vector must have a value of zero to be compliant with the motion vector restriction. For example, the motion vector restriction restricts the motion vector to refer to a sub-portion of the inter-view or inter-layer reference picture, and in this example, the sub-portion of the inter-view or inter-layer reference picture is one that is referred to be a zero motion vector. In other words, the motion vector restriction restricts the motion vector to only refer to a block located at the same position in the inter-view or inter-layer reference picture as the current block is located in the current picture.

Video decoder 30 may derive the motion vector from a motion vector predictor in merge/skip mode or AMVP mode. In the techniques described in this disclosure, the bitstream may not include information (e.g., syntax elements) that causes video decoder 30 to derive the motion vector from the motion vector predictor in such a way that the derived motion vector violates the motion vector restriction in merge/skip mode or AMVP mode when the reference picture is an inter-view or inter-layer reference picture.

For example, in merge/skip mode, video encoder 20 includes in the generated bitstream for output and video decoder 30 receives from the bitstream a merge index into a list of candidate motion vector predictors to identify a merge candidate that will be used for motion compensation. With the index into the list of candidate motion vector predictors, video decoder 30 may determine motion information including the reference picture list, the index into the reference picture list, and the motion vector.

In merge/skip mode, video decoder 30 adopts the motion information of the selected motion vector predictor (i.e., set the motion vector equal to the motion vector predictor to derive the motion vector). In this example, video encoder 20 may determine whether an index into the list of candidate motion vector predictors identifies an index into a reference picture list for an inter-view or inter-layer reference picture. If the index into the list of candidate motion vector predictors identifies motion information that refers to an inter-view or inter-layer reference picture, video encoder 20 may determine whether the motion vector identified by the index into the list of candidate motion vector predictors (i.e., the motion vector predictor) violates the motion vector restriction or is compliant with the motion vector restriction. If video encoder 20 determines that the motion vector predictor violates the motion vector restriction, video encoder 20 may avoid including (i.e., not include) the index into the list of candidate motion vector predictors that would cause video decoder 30 to select the motion vector predictor that would result in a derived motion vector that violates the motion vector restriction.

In this way, for merge/skip mode, the bitstream that video decoder 30 receives and the bitstream that video encoder 20 generates for output may not include information that causes video decoder 30 to derive a motion vector for a current block that violates a motion vector restriction. The motion vector restriction may be for when the motion vector refers to an inter-view or inter-layer reference picture. For example, the motion vector of the motion information identified by the index into the list of candidate motion vector predictors has to satisfy the restriction in merge mode. As one example, the restriction may be that both the horizontal and vertical components are zero, such as in SHVC.

In other words, video encoder 20 may determine an index into the list of candidate motion vector predictors that identifies the motion vector predictor, used to derive the motion vector, whose value is complaint with the motion vector restriction. This is because video decode 30 will set the motion vector equal to the motion vector predictor to derive the motion vector. Therefore, the motion vector predictor, whose value the motion vector adopts, is required to be compliant with the motion vector restriction. Video encoder 20 may generate for output the index into the list of candidate motion vector predictors and the information in the bitstream that video decoder 30 receives includes the index into the list of candidate motion vector predictors.

As described above, AMVP may be slightly different than merge/skip mode. For example, similar to merge/skip mode, video encoder 20 may signal an index into a list of candidate motion vector predictors from which video decoder 30 selects a motion vector predictor. Unlike merge/skip mode, in AMVP mode, video decoder 30 does not adopt the motion vector predictor as the motion vector for the current block. Instead, video encoder 20 also signals a motion vector difference in the bitstream, and video decoder 30 adds or subtracts the motion vector predictor from the motion vector difference to derive the motion vector for the current block. Also, unlike merge/skip mode, in AMVP mode, video decoder 30 does not adopt the reference picture list and the reference picture list index of the motion vector predictor as the reference picture list and reference picture list index. Instead, video encoder 20 signals information identifying the reference picture list and identifying the index into the reference picture list. From this information, video decoder 30 determines the motion information for the current block.

In AMVP mode, video encoder 20 may determine whether the reference picture list index, which video encoder 20 is to signal, into the reference picture list, identified by video encoder 20, identifies an inter-view or inter-layer reference picture. If the reference picture list index identifies an inter-view or inter-layer reference picture, video encoder 20 may signal the motion vector difference such that when the motion vector difference is added to or subtracted from the motion vector predictor, the derived motion vector complies with the motion vector restriction.

In other words, video encoder 20 may determine an index into the list of candidate motion vector predictors that identifies the motion vector predictor used to derive the motion vector, and may determine a motion vector difference such that when the motion vector difference is added to the motion vector predictor the resulting motion vector is compliant with the motion vector restriction.

Video encoder 20 may generate for output the index into the list of candidate motion vector predictors and the information in the bitsream that video decoder 30 receives includes the index into the list of candidate motion vector predictors. Video encoder 20 may also generate for output the motion vector difference and the information in the bitstream that video decoder 30 receives includes the motion vector difference.

Video decoder 30 may determine an index, from the received bitstream, into the list of candidate motion vector predictors that identifies the motion vector predictor used to derive the motion vector and may determine a motion vector difference, from the received bitstream, whose value is such that when the motion vector difference is added to the motion vector predictor the resulting motion vector is compliant with the motion vector restriction. Video decoder 30 may derive the motion vector by adding the motion vector predictor and the motion vector difference.

Again, in AMVP mode, the index into the list of candidate motion vector predictors is used to select a motion vector predictor, and the information identifying a reference picture list and information identifying a reference picture list index into the reference picture list is also signaled to select a reference picture. In the techniques described in this disclosure, video encoder 20 may determine whether the selected reference picture is an inter-view or inter-layer reference picture. If the selected reference picture is an inter-view or inter-layer reference picture, video encoder 20 may determine a motion vector difference that when added to or subtracted from the motion vector predictor, selected via the index into the list of candidate motion vector predictors, causes video decoder 30 to derive a motion vector that is compliant with the motion vector restriction.

As an example, assume that that the motion vector restriction requires the motion vector for the block that refers to an inter-layer reference picture to be zero (i.e., both the x- and y-components are zero). Also, assume that video encoder 20 determined the index into the list of candidate motion vector predictors and video decoder 30 identified the motion vector predictor (MVP) from the index into the list of candidate motion vector predictors. In this example, in AMVP mode, video encoder 20 may signal a motion vector difference (MVD) such that when the MVD is added to MVP, the resulting motion vector equals zero (i.e., the x-component of the MVD is the negative of the x-component of the MVP, and the y-component of the MVD is the negative of the y-component of the MVP).

In this way, for AMVP, the bitstream that video decoder 30 receives and the bitstream that video encoder 20 generates for output may not include information that causes video decoder 30 to derive a motion vector for a current block that violates a motion vector restriction. The motion vector restriction may be for when the motion vector refers to an inter-view or inter-layer reference picture. For example, the motion vector difference may compensate for the motion vector predictor such that the derived motion vector is compliant with the motion vector restriction. In other words, in the techniques described in this disclosure, an MVP and an MVD that together do not satisfy the motion vector restriction should not be present in the bitstream, where the index into the list of candidate motion vector predictors in the bitstream identifies the MVP, and where the MVD is included in the bitstream.

When using motion vector restriction with merge/skip mode and AMVP, there may be certain special cases that need to be addressed. With merge/skip mode, further constraints with respect to TMVP may be needed, and with AMVP, further constraints with respect to flags included in the bitstream may be needed. Each is described in more detail in turn.

As described above, video encoder 20 and video decoder 30 construct the list of candidate motion vector predictors based on the motion information of neighboring blocks including spatial and temporal neighboring blocks. The motion vector of a temporal neighboring block is referred to as a temporal motion vector predictor (TMVP). For motion vector predictors from spatial neighboring blocks (i.e., SMVPs), there is a guarantee that the reference pictures to which they refer are identified in the reference picture list(s) of the picture because the spatial neighboring blocks are in the same picture as the current block. Also, if the motion vector for a spatial neighboring block refers to an inter-view or inter-layer reference picture, then there is guarantee that the motion vector for the spatial neighboring block meets the motion vector restriction.

However, for a motion vector of a temporal neighboring block, there may be no guarantee that the motion vector refers to a reference picture in one of the reference picture lists of the current picture. Furthermore, the motion vector for the temporal neighboring block may violate the motion vector restriction.

In AMVP mode, the reference picture list and reference index are signaled, so even if the TMVP is selected, the derived motion vector will still refer to a picture available in the reference picture list of the current picture. Also, in AMVP mode, if the TMVP violates the motion vector restriction, the motion vector difference can compensate for the TMVP such that the derived motion vector is compliant with the motion vector restriction.

In merge/skip mode, there may be no such control (e.g., no way to compensate the TMVP if the TMVP violates the motion vector restriction). Accordingly, in merge/skip mode, selecting the TMVP (e.g., temporal merging candidate) can result in a motion vector that the outside the motion vector range (i.e., a disparity motion vector or a motion vector that refers to another layer violate the motion vector restriction), since the temporal neighboring block (i.e., co-located block) may include a motion vector pointing to a long-term reference picture which is not an inter-view or inter-layer reference picture.

For instance, in merge/skip mode, if the TMVP is selected, video encoder 20 and video decoder 30 may need to determine the reference picture list and reference picture list index. In merge/skip mode, rather than using the reference picture list and reference picture list index of the TMVP, video encoder 20 and video decoder 30 may utilize a default reference picture list and a default index (e.g., index 0 in HEVC). The default index used for TMVP may be referred to as the TMVP reference index since the default index need not necessarily be limited to index 0.

One technique to ensure that the TMVP conforms to the motion vector restriction is for video encoder 20 and video decoder 30 implement motion vector clipping so that the motion vector is within the motion vector range. However, such TMVP clipping would require video coding changes at the block level of a picture which is not allowed under the high level syntax only (HLS-only) changes described above. In other words, TMVP clipping may function well for 3DV-HEVC, but not for MV-HEVC or SHVC.

To avoid block level changes and be compliant with the HLS-only requirement, there may be additional constraints on the reference picture lists and/or which pictures can be used for inter-prediction so that the TMVP does not cause violation of the motion vector restriction. As one example, video encoder 20 and video decoder 30 may not use a normal temporal long-term reference picture which is not an inter-view reference picture for any view (i.e., any picture) that uses inter-view prediction. The same may be true for any picture that uses inter-layer prediction with inter-layer reference picture for any layer. As another example, any picture that video encoder 20 and video decoder 30 use as a co-located picture (e.g., a temporal picture) for another picture during TMVP cannot have a long-term reference (temporal) picture in any of its reference picture lists.

As another example, video encoder 20 and video decoder 30 may not include an inter-view or inter-layer reference picture (e.g., reference picture from the base view or base layer) into the reference picture list with the reference index equal to the TMVP reference index. For example, as described above, the default reference index for the TMVP is zero in HEVC (i.e., the first entry in the reference picture list). In some examples, video encoder 20 and video decoder 30 may not include an inter-view or inter-layer reference picture into the zero reference index of the reference picture list(s).

As yet another example, video encoder 20 and video decoder 30 may avoid including a TMVP in the list of candidate motion vector predictors. For example, video encoder 20 and video decoder 30 may disable TMVP if motion vector restriction applies and the TMVP reference index (e.g., the zero index in HEVC) of a reference picture list identifies an inter-view or inter-layer reference picture (e.g., a picture in a base view or in a base layer).

The above techniques for addressing the TMVP for merge/skip mode are provided for purposes of illustration only. These techniques may be used in conjunction with another or be used separately.

With AMVP mode, there may be additional constraints with respect to motion vector difference (MVD) control. As described above, video encoder 20 signals and video decoder 30 receives a motion vector difference (MVD) between a motion vector (e.g., one found using best-match search) and a motion vector predictor (MVP). The HEVC standard uses an mvd_l1_zero_flag syntax element that indicates that the MVD for pictures identified in RefPicList1 is not signaled and inferred to be zero. In other words, if mvd_l1_zero_flag is true (e.g., a digital one), then video decoder 30 determines that if the reference picture is in RefPicList1, the MVD is zero. In this case, the derived motion vector equals the MVP since MVD is inferred to be zero.

However, if motion vector restriction is enabled, then there may be a need to use the MVD to compensate for components of the MVP that violate the motion vector restriction. For example, if vertical MV component is going to be restricted, then video decoder 30 should be able to compensate for possibly big vertical component of the MVP with the MVD making the final, derived motion vector in vertical direction satisfy the motion vector restriction. Accordingly, in some examples, video encoder 20 may always signal the MVD when motion vector restriction is enabled and mvd_l1_zero_flag may not be enabled with motion vector restriction.

Therefore, additional constraints on the mvd_l1_zero_flag may be needed in some examples. For example, mvd_l1_zero_flag may be constrained to always be equal to 0 for any view component (e.g., texture view component or depth view component) that uses inter-view prediction. As another example, if motion vector restriction is enabled, video encoder 20 and video decoder 30 may infer the value of mvd_l1_zero_flag to be equal to 0, and video encoder 20 may not signal and video decoder 30 may not receive the value of the mvd_l1_zero_flag in the bitstream. As another example, mvd_l1_zero_flag may still be signaled, but with a disabled value (e.g., 0).

As another example, the techniques may apply the converse. For example, if the mvd_l1_zero_flag is to be true, then motion vector restriction may not be enabled. In other words, video encoder 20 may not signal the motion vector restriction flag indicating that motion vector restriction is enabled if mvd_l1_zero_flag is true, and may signal the motion vector restriction flag indicating that motion vector restriction is enabled only if mvd_l1_zero_flag is false.

Video encoder 20 may implement the condition of signaling the flag indicating that motion vector restriction is enabled only if mvd_l1_zero_flag is false in the following manner.

```
if ( profile_idc ==
"Multi-view support Profile" && mvd_l1_zero_flag == false )
{
    interview_vector_v_restrict_flag              u(1)
    if ( interview_vector_v_restrict_flag == 1 )
    {
        max_interview_vector_v_length_div4        u(4)
    }
}
```

As another example, a simplified technique may be that when motion vector restriction is enabled, no explicitly signaled reference index (under AMVP mode) can point to an inter-view or inter-layer reference picture. For example, in AMVP mode, video encoder 20 may determine whether motion vector restriction is enabled. If motion vector restriction is enabled, video encoder 20 may determine the reference index into a reference picture list that does not refer to an inter-view or inter-layer reference picture. In this example, the mvd_l1_zero_flag may not be constrained to be equal to zero because the video encoder 20 will not select an inter-view or inter-layer reference picture. Hence, the derived motion vector will not refer to an inter-view or inter-layer reference picture, where motion vector restriction may not be applicable.

The immediately above example technique may be considered as a constrained on the reference index. In this example, video encoder 20 may compare the absolute value or alternatively only the positive value (since negative vertical value component may point to already reconstructed blocks for a reference view) with the motion vector restriction requirement. Only if the motion vector is not satisfied with the condition of the motion vector restriction, then reference index referring to inter-view or inter-layer reference picture (e.g., base view or base layer) is not allowed to be used. For example, it may be possible that the derived motion vector with mvd_l1_zero_flag equaling one and the reference index referring to an inter-view or inter-layer reference picture meets the motion vector restriction rule. If the derived motion vector will meet the motion vector restriction rule, then video encoder 20 may select a reference index that refers to an inter-view or inter-layer reference picture, even if mvd_l1_zero_flag is true.

As described above, for multiview video coding, the use of motion vector restriction may be selectable and indicated in the bitstream with a flag or other syntax element that indicates that motion vector restriction is enabled. For scalable video coding, motion vector restriction may be permanently enabled, and in some examples, the motion vector restriction requirement may be that the derived motion vector is a zero vector (e.g., the horizontal (x) component and vertical (y) component of the derived motion vector are both equal to zero if the motion vector refers to an inter-layer reference picture).

The example MVD control techniques described above may be used with scalable video coding techniques (e.g., SHVC) as well. For example, if motion vector is constraint (e.g., motion vector restrictions is being used), video encoder 20 may set the mvd_l1_zero_flag to zero to enable compensation of motion vector predictor by MVD such that the derived motion vector satisfies the constraint (e.g., MV=MVD+MVP=0). In other words, video encoder 20 may avoid the combination of the MVP and MVD that results in the derived motion vector violating the motion vector restriction.

As another example, video encoder 20 may avoid selection of a motion vector predictor that would cause the derived the motion vector to violate the motion vector restriction if mvd_l1_zero_flag is enabled. For example, with mvd_l1_zero_flag enabled, video encoder 20 may only select a motion vector predictor (e.g., AMVP candidate) that can satisfy the constraint (i.e., the motion vector restriction).

For instance, one example may restrict the MV, used to form an inter prediction, to be zero for inter-layer reference picture. That means that MV=MVP+MVD is equal to zero for AMVP mode. As described above, video decoder 30 determines the MVP based on the MVP index (i.e., index into the list of candidate motion vector predictors) signaled by video encoder 20 and received by video decoder 30. For reference list L1 (i.e., RefPicList1), when reference index points to the inter-layer reference picture, MV should be equal to zero, so with enabled mvd_l1_zero_flag, video encoder 20 may only select the index into the list of candidate motion vector predictors that refers to a motion vector predictor with the value of zero (i.e., the horizontal and vertical components are equal to zero). In this way, because MVD is inferred to be equal to zero from the mvd_l1_zero_flag being enabled, the derived motion vector will equal zero because MVP is equal to 0 (i.e., MV=MVP+MVD, and MVP=0 and MVD=0, therefore, MV=0). Accordingly, video encoder 20 should not use and signal the MVP index (i.e., index into a list of candidate motion vector predictors) for the reference index pointing to an inter-layer reference picture that uses nonzero AMVP candidate (i.e., the MVP does not equal 0) with enabled mvd_l1_zero_flag and MV constrained to be zero for inter-layer reference picture.

As another example, mvd_l1_zero_flag may be also disabled (signaled as zero) for the layer that uses MV constraint (i.e., motion vector restriction). As yet another example, video encoder 20 may signal the mvd_l1_zero_flag only for the inter-view or inter-layer (e.g., base view/layer) and mvd_l1_zero_flag signaling can be skipped for the enhancement view/layer with MV constraint and the value of the mvd_l1_zero_flag is inferred to be zero.

As another example, video encoder 20 may signal the mvd_l1_zero_flag only to be zero or inferred to be zero for the enhancement view/layer with MV constraint if the reference picture list L1 (RefPicList1) includes at least one inter-view/layer reference picture. As yet another example, video encoder 20 and video decoder 30 may treat the mvd_l1_zero_flag differently according to the reference picture. For example, if reference picture is inter-view/layer picture, regardless of the mvd_l1_zero_flag, video encoder 20 may always signal the MVD value.

Similar features may also be applied to MVC extensions as well. Also, MV can be constraint to other values rather than zero in above example, the constraint can be done for vertical MV component, horizontal MV component or both. In other words, the motion vector restriction may require that the derived motion vector be restricted to a non-zero value. Also, the restriction may be applicable to just the y-component, just the x-component, or applicable to both the x- and y-components. Furthermore, the restriction of one component need not necessarily be equal to the restriction of the other component.

In general, in some examples, video encoder 20 may determine that a value of a flag (e.g., mvd_l1_zero_flag) always indicates that a motion vector difference for pictures in a reference picture list (e.g., RefPicList1) is not zero, and may generate for output the value of the flag. From the perspective of video decoder 30, video decoder 30 may determine a flag value (e.g., mvd_l1_zero_flag), from the received bitstream, that indicates whether a motion vector difference for pictures identified in a reference picture list (e.g., RefPicList1) in a reference picture list is zero, and the flag value always indicates that the motion vector difference for the pictures in the reference picture list is not zero.

In some examples, for motion vector restriction, the positioning of the inter-view or inter-layer reference picture (e.g., base view or base layer reference picture) may affect the memory bandwidth reduction in addition to the positioning of the inter-view or inter-layer reference picture as described above with respect to TMVP. For instance, an important case for memory bandwidth reduction may be the worst case scenario. Otherwise, if some other non-worst case condition is considered, for video decoder 30, the implementation of the worst case may still needed to be taken into account, or else actual simplification or memory bandwidth reduction may not be achieved. To this end, to benefit from the motion vector restriction (e.g., a disparity motion vector range for multiview video coding or an inter-layer motion vector range for scalable video coding), there may be certain constraints on the reference pictures when motion vector restriction applies.

For instance, assume that the maximum number of different temporal reference pictures for each view component (i.e., texture view component or depth view component) of a view that does not use inter-view prediction to be maxNumTempPics0, and assume the maximum number of different temporal reference pictures for each view component coded with inter-view prediction to be maxNumTempPics1. In some examples, maxNumTempPics0 should be smaller or equal to maxNumTempPics1.

So, to have actual memory bandwidth reduction by restriction vertical component of the motion vector referring to inter-view or inter-layer reference picture (e.g., base view or base layer reference picture), that inter-view or inter-layer reference picture may have to be present in the at least one reference list. Otherwise, if inter-view or inter-layer reference picture is not inserted into the reference picture list and for example other temporal reference pictures can be used instead, then motion vector restriction for motion vectors that refer to the inter-view or inter-layer reference picture does not address the worst case that is to have all temporal pictures as a reference pictures in the reference lists in this example.

In other words, if motion vector restriction is enabled, then the benefits of motion vector restriction such as memory bandwidth reduction may only be available if an inter-view or inter-layer reference picture is included in one of the reference picture lists. Otherwise, all pictures in the reference picture lists would be temporal pictures and motion vector restriction would not be applicable. Accordingly, in some examples, if motion vector restriction is enabled, video encoder 20 and video decoder 30 may be configured to require the inclusion of at least one inter-view or inter-layer reference picture in one of the reference picture lists.

As one example constraint on the reference picture lists, all view components of a non-base view or layer (e.g., dependent view or dependent/enhancement layer) have up to two temporal reference pictures and one inter-view or inter-layer reference picture (e.g., base view or base layer). As another example constraint on the reference picture lists, all view components of a non-base view or layer have up to two temporal reference pictures, some view components are inter-view or inter-layer predicted (with one inter-view or inter layer reference picture) and some are not inter-view or inter-layer predicted.

As described above, for multiview view coding, the use of motion vector restriction may be selectable. In some examples, especially when pixel memory is arranged LCU by LCU, to facilitate the memory access, there may be memory bandwidth reduction benefits when (or only when) the disparity motion vector has a zero vertical component. For simplification of the signaling of disparity motion vector range, in some examples, video encoder 20 may signal a flag that indicates that y-component of the disparity motion vector is restricted to zero in a supplemental enhancement information (SEI) message, a sequence parameter set, a video parameter set, or a video usability information (VUI) message.

The following pseudo-code illustrates the manner for including a flag that indicates that the y-component of the disparity motion vector is restricted to zero in an SEI message.

| parallel_decoding_info( payloadSize ) { | Descriptor |
|---|---|
| video_parameter_set_id | ue(v) |
| zero_vertical_disparity_mv_flag | u(1) |
| if (!zero_vertical_disparity_mv_flag) | |
| pdi_init_delay_ctb_vertical_minus3 | ue(v) |
| pdi_init_delay_ctb_horizontal_minus2 | ue(v) |
| } | | zero_vertical_disparity_mv_flag equal to 1 indicates that a disparity motion vector always has a vertical component equal to 0. zero_vertical_disparity_mv_flag equal to 0 indicates that a disparity motion vector can have a vertical component that is not equal to 0.

video_parameter_set_id specifies a video parameter set that contains the inter-view dependency relationship information. The value of video_parameter_set_id shall be equal to the value of video_parameter_set_id referenced by a view component of the coded picture of the access unit containing the parallel decoding information SEI message.

pdi_init_delay_ctb_vertical_minus3 and pdi_init_delay_ctb_horizontal_minus2 specify the unavailable reference area in any reference view component that shall not be used for inter-view reference by the coded view component which uses inter-view prediction as specified in the active video parameter set identifier is equal to the syntax element video_parameter_set_id contained in the current SEI message.

Variable horCtb is derived as: horCtb=pdi_init_delay_ctb_horizontal_minus2 ? pdi_init_delay_ctb_horizontal_minus2+2+(CtbAddrInRS % PicWidthInCtbsY): 0. Variable verCtb is derived as: verCtb=CtbAddrInRS/PicWidthInCtbsY+pdi_init_delay_ctb_vertical_minus3+3.

When not present, pdi_init_delay_ctb_vertical_minus3 is inferred to be −1 or equivalently, verCtb is inferred to be: CtbAddrInRS/PicWidthInCtbsY+2.

In this manner, the bitstream constraint rule may be formulated as the following set of restrictions. If there is a restriction on the motion vector to be used for motion compensation with the inter-layer/view reference picture (for example identified by reference index from merge/skip or AMVP mode), the bitstream may (e.g., shall) not contain merge/skip index (i.e., index into list of candidate motion vector predictors for merge/skip mode), if merge/skip mode is used, or MVP index (i.e., index into list of candidate motion vector predictors for AMVP mode) and MVD, if AMVP mode is used, that will produce the motion vector that does not satisfy the motion vector restriction. In addition, bitstream may (e.g., shall) not contain non-zero value for mvd_l1_zero_flag (meaning this flag is disabled), since it may be a needed to have non-zero MVD such that MV=MVP+MVD will satisfy the MV constraint (i.e., motion vector restriction) for reference list L1 (RefPicList1).

For example, if one or both components of the motion vector are restricted to be zero for inter-layer/view reference picture, the bitstream may (e.g., shall) not contain merge index for Merge mode, or MVP index and MVD for AMVP mode that will produce non zero motion vector or motion vector component. In addition, bitstream may (e.g., shall) not contain non-zero value for mvd_l1_zero_flag (meaning this flag is disabled), since it may be a needed to have non-zero MVD to make MV=MVP+MVD equal to zero for reference list L1 (RefPicList1).

Some or all of the constraints described above may be imposed on the syntax elements (e.g., information) present in a bitstream. For example, the constraint rule for a bitstream can be formulated as follows: for every reference picture list RefPicListX, for X being either 0 or 1, the merge index (merge_idx), MVP index (mvp_lX_flag), reference index (ref_idx_lX), MVD (MvdLX), and mvd_l1_zero_flag shall provide the MV with the motion vector components satisfying motion vector restriction, for example, both components being equal to zero (e.g., for the SHVC case).

In other words, video encoder 20 and video decoder 30 may each construct a list of candidate motion vector predictors. In merge/skip mode, video encoder 20 may determine an index into the list of candidate motion vector predictors that identifies the motion vector predictor, used to derive the motion vector, whose value is compliant with the motion vector restriction, and generates for output the index into the list of candidate motion vector predictors. In merge/skip mode, video decoder 30 may determine an index, from the received bitstream, into the list of candidate motion vector predictors that identifies the motion vector predictor used to derive the motion vector. In this example, video decoder 30 may set the motion vector equal to the motion vector predictor, and moreover, the motion vector predictor is compliant with the motion vector restriction.

For AMVP mode, video encoder 20 may determine an index into the list of candidate motion vector predictors that identifies the motion vector predictor used to derive the motion vector. Video encoder 20 may also determine a motion vector difference such that when the motion vector difference is added to the motion vector predictor the resulting motion vector is compliant with the motion vector restriction. Video encoder 20 may also generate for output the index into the list of candidate motion vector predictors and the motion vector difference. In AMVP mode, video decoder 30 may determine an index, from the received bitstream, into the list of candidate motion vector predictors that identifies the motion vector predictor used to derive the motion vector, and determines a motion vector difference, from the received bitstream, whose value is such that the motion vector difference is added to the motion vector the resulting motion vector is compliant with the motion vector restriction. Video decoder 30 may derive the motion vector by adding the motion vector predictor and the motion vector difference.

All the description is valid for HEVC SVC extension accomplished as a HLS only solution (there is no changes at a block level), or HLS solution with allowed block level changes. Base layer codec can be HEVC, AVC, MPEG-2 and so on. Restriction can be applied on vertical motion vector (MV) component, horizontal MV component, or both, also including reference list L0 (RefPicList0), reference list L1 (RefPicList1), or both. However, for SVC case restriction for both components of MV referring to inter-layer reference picture to be zero motion vector is one of the use cases.

Accordingly, in some examples, video encoder 20 may be configured to determine information, for deriving a motion vector for a current block from a motion vector predictor, that ensures that the derived motion vector is compliant with a motion vector restriction. In these examples, the motion vector may refer to an inter-view or inter-layer reference picture (e.g., a picture in another view or layer relative to the picture that includes the current block). Also, the motion vector restriction is associated with the motion vector that refers to the inter-view or inter-layer reference picture.

Video encoder 20 may derive the motion vector for the current block based on the information, and inter-view or inter-layer prediction encode the current block based on the derived motion vector. Video encoder 20 may also generate for output the determined information for deriving the motion vector.

In some examples, video decoder 30 may be configured to receive a bitstream that includes information for deriving a motion vector for a current block from a motion vector predictor. Similar to above, the motion vector refers to an inter-view or inter-layer reference picture, and a motion vector restriction is associated with the motion vector that refers to the inter-view or inter-layer reference picture. In the techniques described in this disclosure, the information in the bitstream ensures that the derived motion vector is compliant with the motion vector restriction.

In the techniques described in this disclosure, video decoder 30 may derive the motion vector for the current block based on the information in the bitstream. Video decoder 30 may also inter-view or inter-layer prediction decode the current block based on the derived motion vector.

The above described examples with respect to motion vector restriction for memory bandwidth reduction. The following describes techniques with respect to parallel decoding. The techniques described with respect motion vector restriction for memory bandwidth reduction need not necessarily be used with parallel decoding. In other words, video encoder 20 and video decoder 30 may be configured to implement motion vector restriction, even if video encoder 20 and video decoder 30 do not implement parallel decoding.

As described above, some techniques have relied on macroblock rows to indicate the parallel decoding delay. However, relying on macroblock rows may not be feasible for the HEVC based video coding techniques. Also, some techniques signaled parallel decoding delay in LCU rows, but such values still needed to be converted based on LCU size so that video decoder 30 can determine when to begin the parallel decoding.

For instance, some techniques signaled the motion vector restriction directly (e.g., in JCT3V-B0037). This direct signaling of the motion vector restriction means signaling the restriction of the value of motion vector components. Such techniques would very likely require conversion of the restriction in values of the motion vector components into units of LCU rows, which may be problematic since the LCU row delay would still need to be calculated based on the LCU size, as one example.

In some examples, in accordance with the techniques described in this disclosure, video encoder 20 may signal and video decoder 30 may receive the motion vector restriction information in units based on block sizes. Based on the motion vector restriction information, video decoder 30 may determine when to begin the parallel decoding. As one example, video encoder 20 may generate for output a vertical motion vector range of the motion vector restriction in units of block size, and video decoder 30 may determine, from the received bitstream, a vertical motion vector range of the motion vector restriction in units of block size. The units of block size may comprise one of a unit of largest coding unit height and smallest coding unit height. Video decoder 30 may parallel decode the inter-view or inter-layer reference picture and a current picture that includes the current block based on the vertical motion vector range.

For example, the motion vector restriction may define a range of values for the horizontal and vertical components. In one example, video encoder 20 may signal and video decoder 30 may receive the vertical motion vector range or horizontal motion vector range (e.g., a vertical or horizontal disparity motion vector range or a vertical or horizontal motion vector range for an inter-layer reference picture) in units of largest coding unit (LCU) height or width. As another example, video encoder 20 may signal and video decoder 30 may receive the motion vector restriction range in units of smallest coding unit (SCU). As yet another example, video encoder 20 may signal and video decoder 30 may receive the motion vector restriction range in units of four.

In some examples, if the motion vector restriction indicates that the vertical motion vector range is equal to or approximately zero (meaning that the motion vector always has a vertical component equal to or smaller than zero (e.g., smaller than LCU height)), only then may video encoder 20 signal the horizontal motion vector range. In some examples, video encoder 20 may always signal the horizontal motion vector range.

In some examples, it may be possible for video encoder 20 to signal the LCU row delay directly. The LCU row delay is indicative of the vertical delay. In these examples, when video encoder 20 signals the LCU row delay, video encoder 20 may also signal the LCU column delay directly. The LCU column delay is indicative of the horizontal delay. In these examples, video decoder 30 may receive the LCU row (vertical) delay and the LCU column (horizontal) delay directly from the bitstream. As one example, if the motion vector (e.g., disparity motion vector or motion vector that refers to an inter-layer reference picture) is considered to be typically small (e.g., 0 for vertical component and −2 for horizontal component), the LCU row delay may be made to be 1 and the LCU column delay may be made to be small as well (e.g., 1 or 2).

In the above example, video encoder 20 may signal the parallel decoding delay directly in terms of rows or columns (e.g., LCU row delay and LCU column delay). By directly signaling the parallel decoding delay in terms of rows or columns, conversion of the motion restriction based on the motion vector components to rows or columns may not be needed. In other words, video encoder 20 may already account for the LCU size or size of the block in signaling the LCU row delay and LCU column delay.

The above examples describe the signaling of motion vector restriction (e.g., the motion vector range for the x-component and the y-component or the LCU row or column delay). In some examples, video encoder 20 may signal and video decoder 30 may receive the motion vector restriction in a supplemental enhancement information (SEI) message. In some examples, video encoder 20 may signal and video decoder 30 may receive the motion vector restriction in a video parameter set. In some examples, video encoder 20 may signal and video decoder 30 may receive the motion vector restriction in a sequence parameter set. In some examples, video encoder 20 may signal and video decoder 30 may receive the motion vector restriction in a video usability information (VUI) message.

The following describes example techniques for signaling parallel decoding information. For example, the following provides example pseudo-code and semantics for the pseudo-code for implementing the parallel decoding. These techniques may be implemented separately or in conjunction. Also the examples provided below for the parallel decoding information should not be considered limiting, and are provided merely for illustration purposes. Furthermore, for ease of description the techniques are described with respect to multiview video coding, but such techniques may be extended to scalable video coding techniques as well. For example, where the description is uses terms such as "inter-view reference," the term may be substituted with inter-layer reference. In other words, techniques for inter-view reference may be extended to inter-layer reference as well.

Parallel decoding information SEI message syntax is proved below.

| parallel_decoding_info( payloadSize ) { | Descriptor |
|---|---|
| video_parameter_set_id | ue(v) |
| pdi_init_delay_ctb_vertical_minus2 | ue(v) |
| pdi_init_delay_ctb_horizontal_minus2 | ue(v) |
| } | | video_parameter_set_id specifies a video parameter set that contains the inter-view or inter-layer dependency relationship information. The value of video_parameter_set_id shall be equal to the value of video_parameter_set_id referenced by a view component or layer component of the coded picture of the access unit containing the parallel decoding information SEI message.

pdi_init_delay_ctb_vertical_minus2 and pdi_init_delay_ctb_horizontal_minus2 specify the unavailable reference area in any reference view component or layer picture that shall not be used for inter-view or inter-layer reference by the coded view component which uses inter-view or inter-layer prediction as specified in the active video parameter set identifier is equal to the syntax element video_parameter_set_id contained in the current SEI message.

Variable horCtb is derived as: horCtb=pdi_init_delay_ctb_horizontal_minus2 ? pdi_init_delay_ctb_horizontal_minus2+2+(CtbAddrInRS % PicWidthInCtbsY): 0;

Variable verCtb is derived as: verCtb=CtbAddrInRS/PicWidthInCtbsY+pdi_init_delay_ctb_vertical_minus2+2;

The refCtb address refCtbAddr is derived as: refCtbAddr=Min (horCtb, PicWidthInCtbsY)+verCtb*PicWidthInCtbsY.

The unavailable reference area includes all the coding tree block address equal or larger than refCtbAddr. When decoding the coded view component, samples from the unavailable reference area from the view component of a reference view shall not be referred to by the inter-view or inter-layer prediction process.

The value of pdi_init_delay_ctb_vertical_minus2 shall be in the range of 0 to PicHeightInCtbsY−2, inclusive. The value of pdi_init_delay_ctb_horizontal_minus2 shall be in the range of 0 to PicWidthInCtbsY−2, inclusive.

When pdi_init_delay_ctb_horizontal_minus2 is equal to 0, any LCU (coding tree block) in the LCU row with a vertical address less than verCtb may be used for inter-view or inter-layer prediction. The vertical LCU row delay may (e.g., shall) be equal or larger than 2. The horizontal LCU column delay, if applicable, may (e.g., shall) be equal or larger than 2.

In some examples, a constraint may be required that each view has the same LCU (coding tree block) size. When the views have different LCU sizes, the largest LCU size may apply for the above derivation. Such a largest LCU size may be signaled in video parameter set extension.

When decoding the current LCU, assuming that the horizontal disparity motion vector is very small, video decoder 30 may need the co-located LCU. However, to make the co-located LCU available, bottom, right, and bottom-right LCUs of the co-located LCU may need to be at least de-blocking filtered. To enable that, the bottom and right LCUs of the above mentioned LCUs may need to be predicted (by e.g., motion compensation and/or Intra prediction). In this case, at least two LCU row delay and two LCU column delay may be needed. In other words, to enable in-loop filtering such as Sample Adaptive Offset (SAO) filtering and de-blocking filtering, video decoder 30 may need to wait until additional rows of the inter-view or inter-layer reference picture are reconstructed before beginning the parallel decoding of the current picture.

In some examples, video encoder 20 may signal pdi_init_delay_ctb_horizontal_minus2 only when pdi_init_delay_ctb_vertical_minus2 is equal to 2. As another example, video encoder 20 may only signal the vertical LCU row delay, as follows:

| parallel_decoding_info( payloadSize ) { | Descriptor |
|---|---|
| video_parameter_set_id | ue(v) |
| pdi_init_delay_ctb_minus3 | ue(v) |
| } | | verCtb=CtbAddrinRS/PicWidthInCtbsY+pdi_init_delay_ctb_vertical_minus3+3.

The unavailable reference area is a rectangular area with coordinates (0, (verCtb*PicWidthInCtbsY)) as the top left corner and (PicWidthInSamples,PicHeightInSamples) as the bottom right corner. When decoding the coded view component, samples from the unavailable reference area from the view component of a reference view may (e.g., shall) not be referred to by the inter-view or inter-layer prediction process.

In some examples, video encoder 20 may signal pdi_init_delay_ctb_rs_address, which specifies the LCU delay in the raster scan order. In some examples, video encoder 20 may signal the pdi_init_delay_ctb_rs_address_minusctbwidth. In these examples, pdi_init_delay_ctb_rs_address_minusctbwidth+PicWidthInCtbsY indicates the LCU delay in the raster scan order.

In some examples, video encoder 20 may signal pdi_init_delay_ctb_vertical_minus2 and pdi_init_delay_ctb_horizontal_minus2 separately for each view for all of its reference views or layers. In some examples, video encoder 20 may signal pdi_init_delay_ctb_vertical_minus2 and pdi_init_delay_ctb_horizontal_minus2 separately for each reference view or layer of each view or layer that uses inter-view or inter-layer prediction. For example:

| parallel_decoding_info( payloadSize ) { | Descriptor |
|---|---|
| video_parameter_set_id | ue(v) |
| for( i = 1; i <= vps_max_layers_minus1; i++ ) | |
|   for( j = 0; j < num_direct_ref_layers[ i ]; j++ ) { | |
|     pdi_init_delay_ctb_vertical_minus2[ i ][ j ] | ue(v) |
|     pdi_init_delay_ctb_horizontal_minus2[ i ][ j ] | ue(v) |
|   } | |
| } | |

In some examples, for all the above cases, pdi_init_delay_ctb_horizontal_minus1 is not signaled and inferred to be equal to 0. In some examples, video_parameter_set_id may be signaled as fixed length, e.g., u(4).

When it is assumed that only the pixel reconstruction (including, e.g., motion compensation and intra prediction) needs to be done LCU by LCU while the de-blocking can be done block by block (i.e., 8×8 block) and sample adaptive offset (SAO) filtering may be done line by line, the LCU delay can be decreased significantly. For example, when video encoder 20 only signals the vertical LCU row delay, the minimal row delay is 2. When video encoder 20 signals both the vertical LCU row delay and the horizontal LCU column delay, the minimal row delay is 1 and the minimal LCU column delay is also 1. In the latter case, the syntax can be modified as follows:

| parallel_decoding_info( payloadSize ) { | Descriptor |
|---|---|
| video_parameter_set_id | ue(v) |
| pdi_init_delay_ctb_vertical_minus1 | ue(v) |
| pdi_init_delay_ctb_horizontal_minus1 | ue(v) |
| } | |

The semantics is similar, but with the calculation of verCtb and horCtb slightly modified as follows: Variable horCtb is derived as: horCtb=pdi_init_delay_ctb_horizontal_minus1 ? pdi_init_delay_ctb_horizontal_minus1+1+(CtbAddrinRS % PicWidthInCtbsY): 0; Variable verCtb is derived as: verCtb=CtbAddrInRS/PicWidthInCtbsY+pdi_init_delay_ctb_vertical_minus1+1;

The following describes parallel decoding information SEI message with different LCU sizes is described below. This example is similar to one of the alternatives for the parallel decoding information SEI message, with the additional support for different CTU sizes in the various coded view components. Furthermore, although the examples are described with respect to an SEI message, the techniques may be extended to VUI syntax elements.

Parallel decoding information SEI message syntax is provided below.

| parallel_decoding_info( payloadSize ) { | Descriptor |
|---|---|
| video_parameter_set_id | ue(v) |
| for( i = 1; i <= num_views_minus1; i++ ) { | |
| for( j = 0; j < num_direct_ref_layers[ i ]; j++ ) { | |
| pdi_init_delay_ctu_vertical_minus2[ i ][ j ] | ue(v) |
| pdi_init_delay_ctu_horizontal_minus2[ i ][ j ] | ue(v) |
| } | |
| } | |
| } | |

The parallel decoding information SEI message may be associated with any access unit. The information signaled in the SEI message applies to all the access units starting from the access unit the SEI message is associated with to the next access unit, in decoding order, containing an SEI message of the same type, exclusively, or to the end of the coded video sequence, whichever is earlier in decoding order. It should be understood that some view components for which the parallel decoding information is signaled in a parallel decoding information SEI message may not be present in the coded video sequence.

video_parameter_set_id specifies a video parameter set that contains the inter-view or inter-layer dependency relationship information. The value of video_parameter_set_id may (e.g., shall) be equal to the value of video_parameter_set_id referenced by a view component of the coded picture of the access unit containing the parallel decoding information SEI message.

The variable refLog 2CtbSizeY, refPicWidthInCtbsY[i][j] and refPicHeightInCtbsY[i][j] may be set equal the Log 2CtbSizeY, PicWidthInCtbsY and PicHeightInCtbsY, respectively, for the view component of the j-th reference view of the coded view component i.

pdi_init_delay_ctu_vertical_minus2[i][j] and pdi_init_delay_ctu_horizontal_minus2[i][j] specify the unavailable reference area in the j-th reference view component of i-th coded view component which may (e.g., shall) not be used for inter-view reference by the i-th coded view component that uses inter-view or inter-layer prediction specified in the active video parameter set identified by video_parameter_set_id. The range of pdi_unit_delay_ctu_vertical_minus2[i][j] may (e.g., shall) be 0 to refPicHeightInCtbs−3, inclusive. The range of pdi_unit_delay_ctu_horizontal_minus2[i][j] may (e.g., shall) be 0 to refPicWidthInCtbs−3, inclusive.

In some examples, video encoder 20 may signal a single syntax element pdi_init_delay_ctu_minus2[i][j] and not signal pdi_init_delay_ctu_vertical_minus2[i][j] and pdi_init_delay_ctu_horizontal_minus2[i][j]. In these examples, video decoder 30 may derive the value of pdi_init_delay_ctu_vertical_minus2[i][j] and pdi_init_delay_ctu_horizontal_minus2[i][j] from pdi_init_delay_ctu_minus2[i][j] as follows: pdi_init_delay_ctu_horizontal_minus2[i][j]=pdi_init_delay_ctu_minus2[i][j] % refPicWidthInCtbs, and pdi_init_delay_ctu_vertical_minus2[i][j]=pdi_init_delay_ctu_minus2[i][j]/refPicWidthInCtbs.

The variable horCtb[i][j] is derived as follows: horCtb[i][j]=pdi_init_delay_ctu_horizontal_minus2[i][j] ? pdi_init_delay_ctu_horizontal_minus2[i][j]+2:0. The variable verCtb [i][j] is derived as follows: verCtb[i][j]=pdi_init_delay_ctu_vertical_minus2[i][j] ? pdi_init_delay_ctu_vertical_minus2[i][j]+2:0.

The variable ctbAddr is derived as follows:

if(Log 2*Ctb*SizeY<refLog 2*Ctb*SizeY)

*ctb*Addr=*Ctb*Addrin*RS*>>((refLog 2*Ctb*SizeY−Log 2*Ctb*SizeY)*2))

else

*ctb*Addr=*Ctb*Addrin*RS*<<((Log 2*Ctb*SizeY−refLog 2*Ctb*SizeY)*2)

The variable refCtbAddr[i][j] that denotes the address of refCtb[i][j] is derived as follows: refCtbAddr[i][j]=horCtb[i][j]+verCtb[i][j]*refPicWidthInCtbsY[i][j]+ctbAddr.

The unavailable reference area in the j-th reference view of the coded view component i includes all the coding tree units with an address equal or larger than refCtbAddr[i][j]. When decoding the i-th coded view component, samples from the unavailable reference area from the view component of the j-th reference view of coded view component i may (e.g., shall) not be referred to by the inter-view or inter-layer prediction process.

Figure 5:
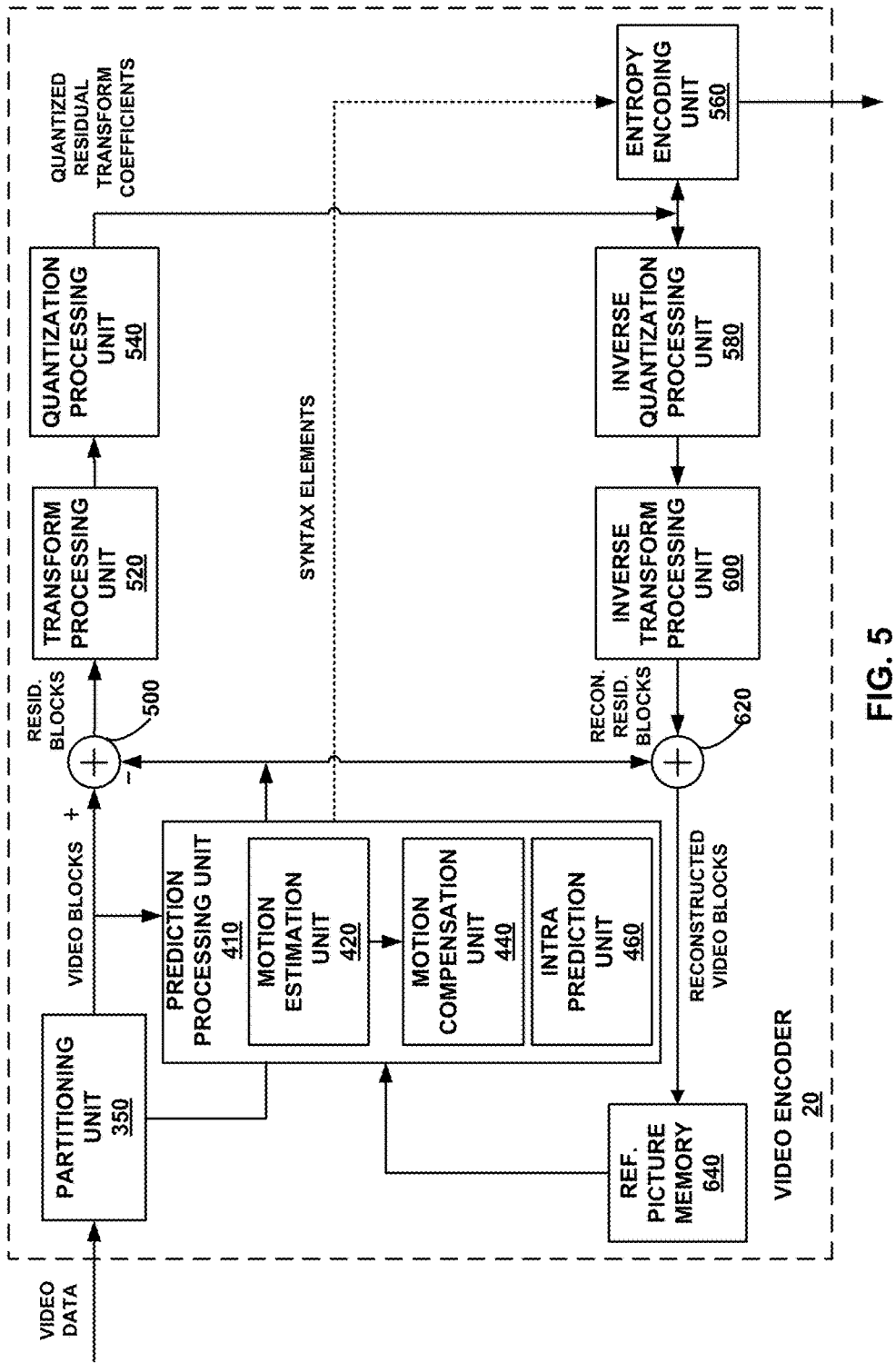
FIG. 5 is a block diagram illustrating an example video encoder that may implement the techniques described in this disclosure.

FIG. 5 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes. Video encoder 20 may also perform inter-view prediction coding and inter-layer prediction coding, in which video encoder 20 uses blocks for other views or layers for inter-prediction.

In the example of FIG. 5, video encoder 20 includes a partitioning unit 350, prediction processing unit 410, reference picture memory 640, summer 500, transform processing unit 520, quantization processing unit 540, and entropy encoding unit 560. Reference picture memory 640 is an example of a decoded picture buffer (DPB). Prediction processing unit 410 includes motion estimation unit 420, motion compensation unit 440, and intra prediction unit 460. For video block reconstruction, video encoder 20 also includes inverse quantization processing unit 580, inverse transform processing unit 600, and summer 620. A deblocking filter (not shown in FIG. 5) may also be included to filter block boundaries to remove blockiness artifacts from reconstructed video. If desired, the deblocking filter would typically filter the output of summer 620. Additional loop filters (in loop or post loop) may also be used in addition to the deblocking filter.

As shown in FIG. 5, video encoder 20 receives video data, and partitioning unit 350 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 410 may select one of a plurality of possible coding modes, such as one of a plurality of intra coding modes or one of a plurality of inter coding modes, for the current video block based on error results (e.g., coding rate and the level of distortion). Prediction processing unit 410 may provide the resulting intra- or inter-coded block to summer 500 to generate residual block data and to summer 620 to reconstruct the encoded block for use as a reference picture.

Intra prediction unit 460 within prediction processing unit 410 may perform intra-predictive coding of the current video block relative to one or more neighboring blocks in the same frame or slice as the current block to be coded to provide spatial compression. Motion estimation unit 420 and motion compensation unit 440 within prediction processing unit 410 perform inter-predictive coding of the current video block relative to one or more predictive blocks in one or more reference pictures to provide temporal compression.

Motion estimation unit 420 may be configured to determine the inter-prediction mode for a video slice according to a predetermined pattern for a video sequence. Motion estimation unit 420 and motion compensation unit 440 may be highly integrated, but are illustrated separately for conceptual purposes. Motion estimation, performed by motion estimation unit 420, is the process of generating motion vectors, which estimate motion for video blocks. A motion vector, for example, may indicate the displacement of a PU of a video block within a current video frame or picture relative to a predictive block within a reference picture. Motion estimation unit 420 may also determine the motion vector predictor to determine the motion vector difference (MVD).

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 640. For example, video encoder 20 may interpolate values of one-quarter pixel positions, one-eighth pixel positions, or other fractional pixel positions of the reference picture. Therefore, motion estimation unit 420 may perform a motion search relative to the full pixel positions and fractional pixel positions and output a motion vector with fractional pixel precision.

Motion estimation unit 420 calculates a motion vector for a PU of a video block in an inter-coded slice by comparing the position of the PU to the position of a predictive block of a reference picture. The reference picture may be selected from a first reference picture list (List 0 or RefPicList0) or a second reference picture list (List 1 or RefPicList1), each of which identify one or more reference pictures stored in reference picture memory 640. Motion estimation unit 420 sends the calculated motion vector to entropy encoding unit 56 and motion compensation unit 440. Motion estimation unit 420 may also send the calculated motion vector predictor and the MVD to entropy encoding unit 560.

Motion compensation, performed by motion compensation unit 440, may involve fetching or generating the predictive block based on the motion vector determined by motion estimation, possibly performing interpolations to sub-pixel precision. Upon receiving the motion vector for the PU of the current video block, motion compensation unit 440 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 500 represents the component or components that perform this subtraction operation. Motion compensation unit 440 may also generate syntax elements (e.g., information) associated with the video blocks and the video slice for use by video decoder 30 in decoding the video blocks of the video slice.

Intra-prediction unit 460 may intra-predict a current block, as an alternative to the inter-prediction performed by motion estimation unit 420 and motion compensation unit 440, as described above. In particular, intra-prediction unit 460 may determine an intra-prediction mode to use to encode a current block. In some examples, intra-prediction unit 460 may encode a current block using various intra-prediction modes, e.g., during separate encoding passes, and intra-prediction unit 460 may select an appropriate intra-prediction mode to use from the tested modes. For example, intra-prediction unit 460 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction unit 460 may calculate ratios from the distortions and rates for the various encoded blocks to determine which intra-prediction mode exhibits the best rate-distortion value for the block.

In any case, after selecting an intra-prediction mode for a block, intra-prediction unit 460 may provide information indicative of the selected intra-prediction mode for the block to entropy encoding unit 560. Entropy encoding unit 560 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 410 generates the predictive block for the current video block via either inter-prediction or intra-prediction, video encoder 20 forms a residual video block by subtracting the predictive block from the current video block. The residual video data in the residual block may be included in one or more TUs and applied to transform processing unit 520. Transform processing unit 520 transforms the residual video data into residual transform coefficients using a transform, such as a discrete cosine transform (DCT) or a conceptually similar transform. Transform processing unit 520 may convert the residual video data from a pixel domain to a transform domain, such as a frequency domain.

Transform processing unit 520 may send the resulting transform coefficients to quantization processing unit 540. Quantization processing unit 540 quantizes the transform coefficients to further reduce bit rate. The quantization process may reduce the bit depth associated with some or all of the coefficients. The degree of quantization may be modified by adjusting a quantization parameter. In some examples, quantization processing unit 540 may then perform a scan of the matrix including the quantized transform coefficients. Alternatively, entropy encoding unit 560 may perform the scan.

Following quantization, entropy encoding unit 560 entropy encodes the quantized transform coefficients. For example, entropy encoding unit 560 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 560, the encoded bitstream may be transmitted to video decoder 30, or archived for later transmission or retrieval by video decoder 30. Entropy encoding unit 560 may also entropy encode the motion vectors and the other syntax elements for the current video slice being coded.

Inverse quantization processing unit 580 and inverse transform processing unit 600 apply inverse quantization and inverse transformation, respectively, to reconstruct the residual block in the pixel domain for later use as a reference block of a reference picture. Motion compensation unit 440 may calculate a reference block by adding the residual block to a predictive block of one of the reference pictures within one of the reference picture lists. Motion compensation unit 440 may also apply one or more interpolation filters to the reconstructed residual block to calculate sub-integer pixel values for use in motion estimation. Summer 620 adds the reconstructed residual block to the motion compensated prediction block produced by motion compensation unit 440 to produce a reference block for storage in reference picture memory 640. The reference block may be used by motion estimation unit 420 and motion compensation unit 440 as a reference block to inter-predict a block in a subsequent video frame or picture.

In some examples, prediction processing unit 410 may be configured to implement the techniques described in this disclosure. However, the techniques described in this disclosure are not so limited. In some examples, prediction processing unit 410 in conjunction with one or more other units within video encoder 20 may be configured to implement the techniques described in this disclosure. In some examples, a processing unit (not shown in FIG. 5) may be configured to implement the techniques described in this disclosure. In other words, video encoder 20 may include one or more processors and may be configured to implement the example techniques described in this disclosure.

For example, video encoder 20 (e.g., via prediction processing unit 410) may ensure that the information signaled in the bitstream that video decoder 30 receives causes video decoder 30 to derive a motion vector that is compliant with the motion vector restriction. As one example, for merge/skip mode, video encoder 20 may determine information such as an index into a list of candidate motion vector predictors that identifies the motion vector predictor, used to derive the motion vector, whose value is compliant with the motion vector restriction. As another example, for AMVP mode, video encoder 20 may determine an index into a list of candidate motion vector predictors that identifies the motion vector predictor used to derive the motion vector. Video encoder 20 may also determine a motion vector difference such that when the motion vector difference is added to the motion vector predictor the resulting motion vector is compliant with the motion vector restriction. In the examples for merge/skip mode and AMVP mode, video encoder 20 may generate for output the index into the list of candidate motion vector predictors. For the AMVP mode, video encoder 20 may also generate for output the motion vector difference.

In some examples, video encoder 20 may determine that a value of a flag (e.g., the mvd_l1_zero_flag) always indicates that a motion vector difference for a picture in a reference picture is not zero. Video encoder 20 may also generate for output the value of the flag in the bitstream.

For parallel decoding, video encoder 20 may output a vertical motion vector range of the motion vector restriction in units of block size. For instance, the motion vector restriction may include at least one of a vertical motion vector range and a horizontal motion vector range. In these examples, the units of block size may be one of a unit of largest coding unit height and smallest coding unit height for the vertical vector range and a unit of largest coding unit width and smallest coding unit width for the horizontal vector range.

In some examples, video encoder 20 may determine an unavailable reference area in any inter-view or any inter-layer reference picture, including the first inter-view or inter-layer reference picture, that cannot be used for inter-view or inter-layer reference by the current block. In these examples, video encoder 20 may derive the motion vector for the current block based on the determined unavailable area such that the motion vector does not refer to the unavailable reference area in any inter-view or inter-layer reference picture. Video encoder 20 may also be configured to generate for output information indicating the unavailable reference area. As one example, video encoder 20 may generate for output information indicating the unavailable reference area in raster scan order.

Figure 6:
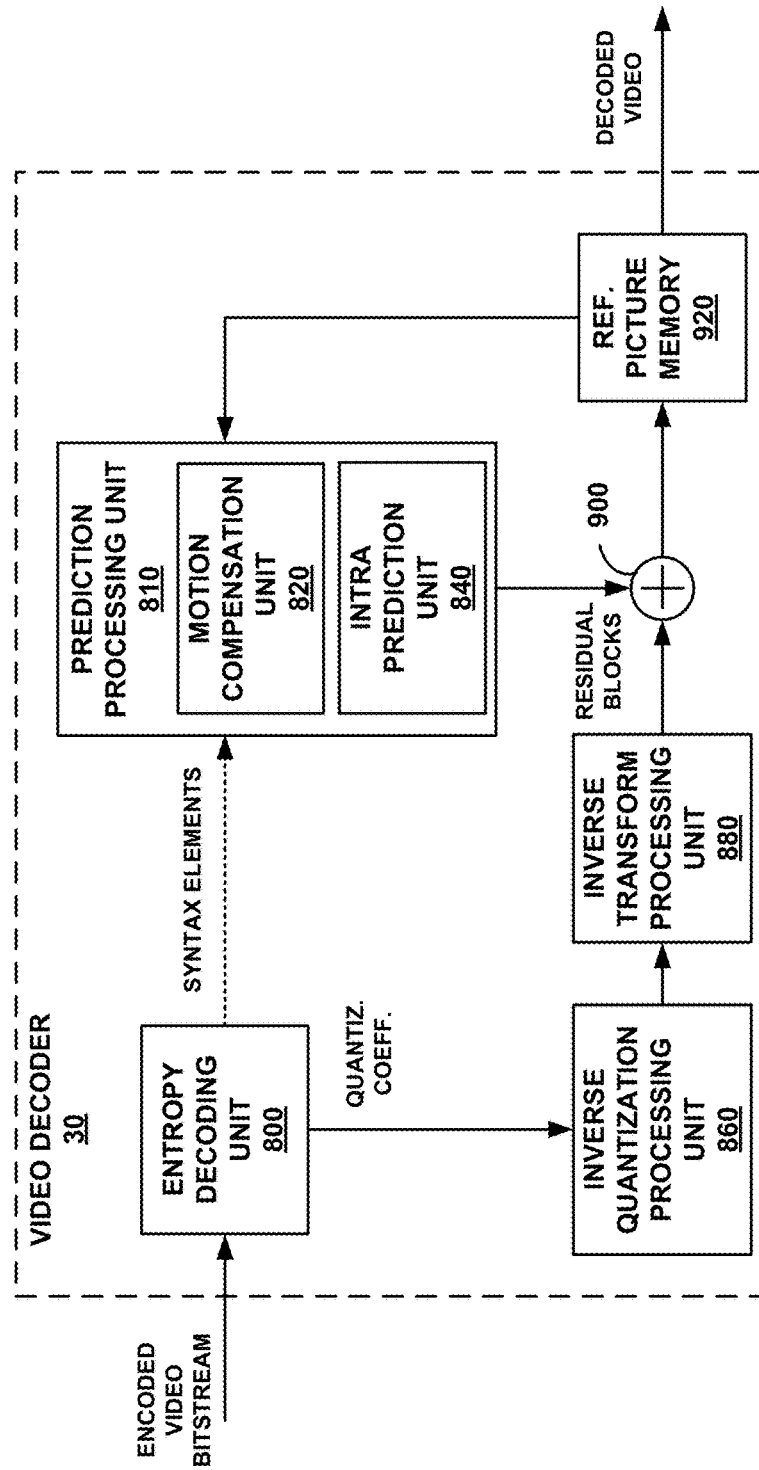
FIG. 6 is a block diagram illustrating an example video decoder that may implement the techniques described in this disclosure.

FIG. 6 is a block diagram illustrating an example video decoder 30 that may implement the techniques described in this disclosure. In the example of FIG. 6, video decoder 30 includes an entropy decoding unit 800, prediction processing unit 810, inverse quantization processing unit 860, inverse transformation unit 880, summer 900, and reference picture memory 920. Reference picture memory 920 is an example of a decoded picture buffer (DPB). Prediction processing unit 810 includes motion compensation unit 820 and intra prediction unit 840. Video decoder 30 may, in some examples, perform a decoding pass generally reciprocal to the encoding pass described with respect to video encoder 20 from FIG. 5.

In some examples, prediction processing unit 810 may be configured to implement the techniques described in this disclosure. However, the techniques described in this disclosure are not so limited. In some examples, prediction processing unit 810 in conjunction with one or more other units within video decoder 30 may be configured to implement the techniques described in this disclosure. In some examples, a processing unit (not shown in FIG. 6) may be configured to implement the techniques described in this disclosure.

During the decoding process, video decoder 30 receives an encoded video bitstream that represents video blocks of an encoded video slice and associated syntax elements from video encoder 20. Entropy decoding unit 800 of video decoder 30 entropy decodes the bitstream to generate quantized coefficients, motion vectors, and other syntax elements. Entropy decoding unit 800 forwards the motion vectors and other syntax elements to prediction processing unit 810. Video decoder 30 may receive the syntax elements at the video slice level and/or the video block level.

When the video slice is coded as an intra-coded (I) slice, intra prediction unit 840 of prediction processing unit 810 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 820 of prediction processing unit 810 produces predictive blocks for a video block of the current video slice based on the motion vectors and other syntax elements received from entropy decoding unit 800. The predictive blocks may be produced from one of the reference pictures within one of the reference picture lists. Video decoder 30 may construct the reference frame lists, List 0 and List 1, using default construction techniques or any other technique based on reference pictures stored in reference picture memory 920.

Motion compensation unit 820 determines prediction information for a video block of the current video slice by parsing the motion vectors and other syntax elements, and uses the prediction information to produce the predictive blocks for the current video block being decoded. For example, motion compensation unit 820 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 820 may also perform interpolation based on interpolation filters. Motion compensation unit 820 may use interpolation filters as used by video encoder 20 during encoding of the video blocks to calculate interpolated values for sub-integer pixels of reference blocks. In this case, motion compensation unit 820 may determine the interpolation filters used by video encoder 20 from the received syntax elements and use the interpolation filters to produce predictive blocks.

Inverse quantization processing unit 860 inverse quantizes, i.e., de-quantizes, the quantized transform coefficients provided in the bitstream and decoded by entropy decoding unit 800. The inverse quantization process may include use of a quantization parameter calculated by video encoder 20 for each video block in the video slice to determine a degree of quantization and, likewise, a degree of inverse quantization that should be applied. Inverse transform processing unit 880 applies an inverse transform, e.g., an inverse DCT, an inverse integer transform, or a conceptually similar inverse transform process, to the transform coefficients in order to produce residual blocks in the pixel domain.

After motion compensation unit 820 generates the predictive block for the current video block based on the motion vectors and other syntax elements, video decoder 30 forms a decoded video block by summing the residual blocks from inverse transform processing unit 880 with the corresponding predictive blocks generated by motion compensation unit 820. Summer 900 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 920, which stores reference pictures used for subsequent motion compensation. Reference picture memory 920 also stores decoded video for later presentation on a display device, such as display device 32 of FIG. 4.

In this manner, video decoder 30 is an example of a video decoder configured to implement the example techniques described in this disclosure. For instance, video decoder 30 may include one or more processors and may be configured to implement the examples techniques described in this disclosure.

For example, video decoder 30 may derive a motion vector from a motion vector predictor that is ensured to be compliant with the motion vector restriction. For example, in merge/skip mode, video decoder 30 sets the motion vector equal to the motion vector predictor, and therefore, the motion vector predictor is required to be compliant with the motion vector restriction. In AMVP mode, video decoder 30 determines a motion vector difference, from the bitstream, whose value is such that when the motion vector difference is added to the motion vector predictor the resulting motion vector is compliant with the motion vector restriction. In this example, video decoder 30 may derive the motion vector by adding the motion vector predictor and the motion vector difference.

In some examples, video decoder 30 may determine, from the received bitstream, a vertical motion vector range of the motion vector restriction of block size. Video decoder 30 may parallel decode the inter-view or inter-layer reference picture and a current picture that includes the current block based on the vertical motion vector range.

Also, in some examples, video decoder 30 may determine, from the received bitstream, an unavailable reference area in any inter-view or any inter-layer reference picture that cannot be used for inter-view or inter-layer reference by the current block. In these examples, video decoder 30 may derive the motion vector for the current block based on the information in the bitstream such that the motion vector does not refer to the unavailable reference area in any inter-view or any inter-layer reference picture. As one example, video decoder 30 may determine the unavailable reference area in raster scan order.

Figure 7:
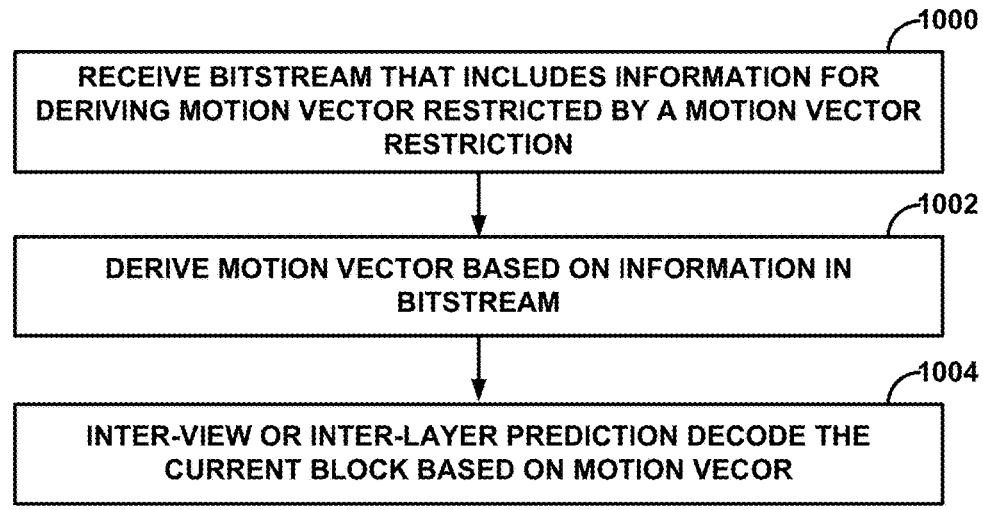
FIG. 7 is a flowchart illustrating an example operation of inter-view or inter-layer video decoding in accordance with techniques described in this disclosure.

FIG. 7 is a flowchart illustrating an example operation of inter-view or inter-layer video decoding in accordance with techniques described in this disclosure. For purposes of illustration, the techniques are described with respect to video decoder 30. For example, video decoder 30 may receive a bitstream that includes information for deriving a motion vector for a current block from a motion vector predictor (1000). The motion vector may refer to an inter-view or inter-layer reference picture. The bitstream may be constrained such that information received from the bitstream may ensure that the derived motion vector is compliant with a motion vector restriction. Also, the motion vector restriction restricts a range of the motion vector to refer to a sub-portion of the inter-view or inter-layer reference picture.

Video decoder 30 may derive the motion vector for the current block based on the information in the bitstream (1002). Video decoder 30 may inter-view or inter-layer prediction decode the current block based on the derived motion vector (1004).

Figure 8:
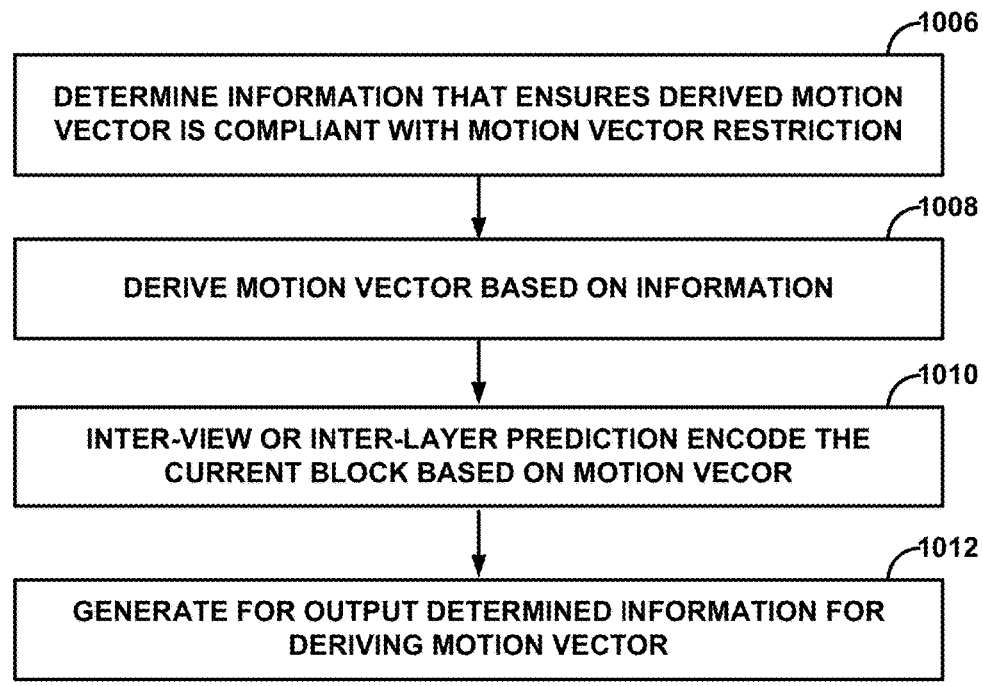
FIG. 8 is a flowchart illustrating an example operation of inter-view or inter-layer video encoding in accordance with techniques described in this disclosure.

FIG. 8 is a flowchart illustrating an example operation of inter-view or inter-layer video encoding in accordance with techniques described in this disclosure. For purposes of illustration, the techniques are described with respect to video decoder 30. For example, video encoder 20 may determine information, which is used for deriving a motion vector for a current block from a motion vector predictor, that ensures that the derived motion vector is compliant with a motion vector restriction (1006). Similar to above, the motion vector refers to an inter-view or an inter-layer reference picture, and the motion vector restriction restricts a range of the motion vector to refer to a sub-portion of the inter-view or inter-layer reference picture.

Video encoder 20 may derive the motion vector for the current block based on the information (1008). Video encoder 20 may inter-view or inter-layer prediction encode the current block based on the derived motion vector (1010). Video encoder 20 may generate for output the determined information for deriving the motion vector (1012).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of inter-view video decoding or inter-layer video decoding, the method comprising:
    constructing a list of candidate motion vector predictors;
    receiving a bitstream that includes information including an index into the list of candidate motion vector predictors for selecting a motion vector predictor from the list of candidate motion vector predictors and information for deriving a motion vector for a current block from the selected motion vector predictor, wherein the motion vector refers to a block in an inter-view reference picture or an inter-layer reference picture, wherein the bitstream is constrained such that the derived motion vector is compliant with a motion vector restriction, wherein the motion vector restriction restricts a range of the motion vector to refer to a sub-portion of the inter-view reference picture or inter-layer reference picture, wherein based on the list of candidate motion vector predictors being for merge mode, the bitstream is constrained such that the index into the list of candidate motion vector predictors selects the motion vector predictor that is equal to zero, and wherein based on the list of candidate motion vector predictors being for advanced motion vector prediction (AMVP) mode, the bitstream is constrained such that the index into the list of candidate motion vector predictors selects the motion vector predictor that added with a motion vector difference equals zero;
    deriving the motion vector for the current block based on the information in the bitstream; and
    inter-view prediction decoding or inter-layer prediction decoding the current block based on pixel values of the block referred to by the derived motion vector.

2. The method of claim 1, wherein the information includes syntax elements in the bitstream.

3. The method of claim 1,
    wherein deriving the motion vector comprises setting the motion vector equal to the motion vector predictor, and
    wherein the motion vector predictor is required to be compliant with the motion vector restriction.

4. The method of claim 1, further comprising:
    determining the motion vector difference, from the received bitstream, whose value is such that when the motion vector difference is added to the motion vector predictor the resulting motion vector is compliant with the motion vector restriction,
    wherein deriving the motion vector comprises adding the motion vector predictor and the motion vector difference.

5. The method of claim 1, further comprising:
determining a flag value, from the received bitstream, that indicates whether a motion vector difference for pictures identified in a reference picture list is zero, wherein the flag value always indicates that the motion vector difference for the pictures in the reference picture list is not zero.

6. The method of claim 1, wherein, when the motion vector refers to the inter-layer reference picture, the motion vector restriction indicates that the derived motion vector should equal zero.

7. The method of claim 1, the further comprising:
determining, from the received bitstream, a vertical motion vector range of the motion vector restriction in units of block size; and
parallel decoding the inter-view reference picture or inter-layer reference picture and a current picture that includes the current block based on the vertical motion vector range.

8. The method of claim 7, wherein the units of block size comprise one of a unit of largest coding unit height and smallest coding unit height.

9. The method of claim 1, wherein the inter-view reference picture or inter-layer reference picture includes a first inter-view reference picture or inter-layer reference picture, the method further comprising:
determining, from the received bitstream, an unavailable reference area in any inter-view reference picture or any inter-layer reference picture, including the first inter-view reference picture or inter-layer reference picture, that cannot be used for inter-view reference or inter-layer reference by the current block,
wherein deriving the motion vector comprises deriving the motion vector for the current block based on the information in the bitstream such that the motion vector does not refer to the unavailable reference area in any inter-view reference picture or any inter-layer reference picture.

10. The method of claim 9, wherein determining the unavailable reference area comprises determining the unavailable reference area in raster scan order.

11. A method of inter-view video encoding or inter-layer video encoding, the method comprising:
constructing a list of candidate motion vector predictors;
determining that a reference picture for a current block is an inter-view reference picture or inter-layer reference picture;
based on the reference picture for the current block being the inter-view reference picture or inter-layer reference picture, determining that a motion vector for the current block is to equal zero such that the motion vector is compliant with a motion vector restriction, wherein the motion vector refers to a block in the inter-view reference picture or inter-layer reference picture;
determining that the current block is inter-view prediction encoded or inter-layer prediction encoded using merge mode or advanced motion vector prediction (AMVP) mode;
based on the current block being encoded using merge mode, selecting a first motion vector predictor, from the list of candidate motion vector predictors, that is equal to zero, or
based on the current block being encoded using AMVP mode, selecting a second motion vector predictor, from the list of candidate motion vector predictors, that added with a motion vector difference equals zero;
determining information including determining an index into the list of candidate motion vector predictors based on the selected one of the first motion vector predictor or the second motion vector predictor, which is used for deriving the motion vector for the current block from the selected first or second motion vector predictor;
inter-view prediction encoding or inter-layer prediction encoding the current block based on pixel values of the block referred to by the motion vector; and
generating for output the determined information for deriving the motion vector.

12. The method of claim 11, wherein the information includes syntax elements that are generated for output.

13. The method of claim 11,
wherein determining information comprises determining the index into the list of candidate motion vector predictors that identifies the first motion vector predictor, used to derive the motion vector, whose value is compliant with the motion vector restriction, and
wherein generating for output comprises generating for output the index into the list of candidate motion vector predictors.

14. The method of claim 11,
wherein determining information comprises:
determining the index into the list of candidate motion vector predictors that identifies the second motion vector predictor used to derive the motion vector; and
determining the motion vector difference such that when the motion vector difference is added to the second motion vector predictor the resulting motion vector is compliant with the motion vector restriction, and
wherein generating for output comprises generating for output the index into the list of candidate motion vector predictors and the motion vector difference.

15. The method of claim 11, wherein determining information comprises determining that a value of a flag always indicates that a motion vector difference for pictures in a reference picture list is not zero, and wherein generating for output comprises generating for output the value of the flag.

16. The method of claim 11, wherein, when the motion vector refers to the inter-layer reference picture, the motion vector restriction indicates that the derived motion vector should equal zero.

17. The method of claim 11, further comprising:
generating for output a vertical motion vector range of the motion vector restriction in units of block size.

18. The method of claim 17, wherein the units of block size comprise one of a unit of largest coding unit height and smallest coding unit height.

19. The method of claim 11, wherein the inter-view reference picture or inter-layer reference picture includes a first inter-view reference picture or inter-layer reference picture, the method further comprising:
determining an unavailable reference area in any inter-view reference picture or any inter-layer reference picture, including the first inter-view reference picture or inter-layer reference picture, that cannot be used for inter-view reference or inter-layer reference by the current block,
wherein deriving the motion vector comprises deriving the motion vector for the current block based on the determined unavailable area such that the motion vector does not refer to the unavailable reference area in any inter-view reference picture or inter-layer reference picture; and generating for output information indicating the unavailable reference area.

20. The method of claim 19, wherein generating for output information indicating the unavailable reference area comprises generating for output information indicating the unavailable reference area in raster scan order.

21. A device comprising:
a memory configured to store an inter-view reference picture or an inter-layer reference picture; and
a video decoder, the video decoder comprising one or more processors and configured to:
construct a list of candidate motion vector predictors;
receive a bitstream that includes information including an index into the list of candidate motion vector predictors for selecting a motion vector predictor from the list of candidate motion vector predictors and information for deriving a motion vector for a current block from the selected motion vector predictor, wherein the motion vector refers to a block in the inter-view reference picture or the inter-layer reference picture, wherein the bitstream is constrained such that the derived motion vector is compliant with a motion vector restriction, wherein the motion vector restriction restricts a range of the motion vector to refer to a sub-portion of the inter-view reference picture or inter-layer reference picture, wherein based on the list of candidate motion vector predictors being for merge mode, the bitstream is constrained such that the index into the list of candidate motion vector predictors selects the motion vector predictor that is equal to zero, and wherein based on the list of candidate motion vector predictors being for advanced motion vector prediction (AMVP) mode, the bitstream is constrained such that the index into the list of candidate motion vector predictors selects the motion vector predictor that added with a motion vector difference equals zero;
derive the motion vector for the current block based on the information in the bitstream; and
inter-view prediction decode or inter-layer prediction decode the current block based on pixel values of the block referred to by the derived motion vector.

22. The device of claim 21, wherein the information includes syntax elements in the bitstream.

23. The device of claim 21,
wherein to derive the motion vector, the video decoder is configured to set the motion vector equal to the motion vector predictor, and
wherein the motion vector predictor is required to be compliant with the motion vector restriction.

24. The device of claim 21, wherein the video decoder is configured to:
determine the motion vector difference, from the received bitstream, whose value is such that when the motion vector difference is added to the motion vector predictor the resulting motion vector is compliant with the motion vector restriction,
wherein to derive the motion vector, the video decoder is configured to add the motion vector predictor and the motion vector difference.

25. The device of claim 21, wherein the video decoder is configured to:
determine a flag value, from the received bitstream, that indicates whether a motion vector difference for pictures identified in a reference picture list is zero, wherein the flag value always indicates that the motion vector difference for the pictures in the reference picture list is not zero.

26. The device of claim 21, wherein the video decoder is configured to:
determine, from the received bitstream, a vertical motion vector range of the motion vector restriction in units of block size; and
parallel decode the inter-view reference picture or inter-layer reference picture and a current picture that includes the current block based on the vertical motion vector range.

27. The device of claim 21, wherein the inter-view reference picture or inter-layer reference picture includes a first inter-view reference picture or inter-layer reference picture, and wherein the video decoder is configured to:
determine, from the received bitstream, an unavailable reference area in any inter-view reference picture or any inter-layer reference picture, including the first inter-view reference picture or inter-layer reference picture, that cannot be used for inter-view reference or inter-layer reference by the current block,
wherein to derive the motion vector the video decoder is configured to derive the motion vector for the current block based on the information in the bitstream such that the motion vector does not refer to the unavailable reference area in any inter-view reference picture or any inter-layer reference picture.

28. The device of claim 27, wherein to determine the unavailable reference area the video decoder is configured to determine the unavailable reference area in raster scan order.

29. The device of claim 21, wherein the device comprises one of:
a wireless communication device;
a microprocessor; or
an integrated circuit.

30. A device comprising:
a memory configured to store an inter-view reference picture or an inter-layer reference picture; and
a video encoder, the video encoder comprising one or more processors and configured to:
construct a list of candidate motion vectors predictors;
determine that a reference picture for a current block is an inter-view reference picture or inter-layer reference picture;
based on the reference picture for the current block being the inter-view reference picture or inter-layer reference picture, determine that a motion vector for the current block is to equal zero such that the motion vector is compliant with a motion vector restriction, wherein the motion vector refers to a block in the inter-view reference picture or inter-layer reference picture;
determine that the current block is inter-view prediction encoded or inter-layer prediction encoded using merge mode or advanced motion vector prediction (AMVP) mode;
based on the current block being encoded using merge mode, select a first motion vector predictor, from the list of candidate motion vector predictors, that is equal to zero, or
based on the current block being encoded using AMVP mode, select a second motion vector predictor, from the list of candidate motion vector predictors, that added with a motion vector difference equals zero;
determine information including determining an index into the list of candidate motion vector predictors based on the selected one of the first motion vector predictor or the second motion vector predictor, which is used for deriving the motion vector for the current block from the selected first or second motion vector predictor;
inter-view prediction encode or inter-layer prediction encode the current block based on pixel values of the block referred to by the motion vector; and
generate for output the determined information for deriving the motion vector.

31. The device of claim 30, wherein the information includes syntax elements that are generated for output.

32. The device of claim 30,
wherein to determine information, the video encoder is configured to determine the index into the list of candidate motion vector predictors that identifies the first motion vector predictor, used to derive the motion vector, whose value is compliant with the motion vector restriction, and
wherein to generate for output, the video encoder is configured to generate for output the index into the list of candidate motion vector predictors.

33. The device of claim 30,
wherein to determine information, the video encoder is configured to:
determine the index into the list of candidate motion vector predictors that identifies the second motion vector predictor used to derive the motion vector; and
determine the motion vector difference such that when the motion vector difference is added to the second motion vector predictor the resulting motion vector is compliant with the motion vector restriction, and
wherein to generate for output, the video encoder is configured to generate for output the index into the list of candidate motion vector predictors and the motion vector difference.

34. The device of claim 30, wherein to determine information, the video encoder is configured to determine that a value of a flag always indicates that a motion vector difference for pictures in a reference picture list is not zero, and wherein to generate for output, the video encoder is configured to generate for output the value of the flag.

35. The device of claim 34, wherein the video encoder is configured to:
generate for output a vertical motion vector range of the motion vector restriction in units of block size.

36. The device of claim 30, wherein the inter-view reference picture or inter-layer reference picture includes a first inter-view reference picture or inter-layer reference picture, and wherein the video encoder is configured to:
determine an unavailable reference area in any inter-view reference picture or any inter-layer reference picture, including the first inter-view reference picture or inter-layer reference picture, that cannot be used for inter-view reference or inter-layer reference by the current block,
wherein to derive the motion vector the video encoder is configured to derive the motion vector for the current block based on the determined unavailable area such that the motion vector does not refer to the unavailable reference area in any inter-view reference picture or inter-layer reference picture; and
generate for output information indicating the unavailable reference area.

37. The device of claim 36, wherein to generate for output information indicating the unavailable reference area the video encoder is configured to generate for output information indicating the unavailable reference area in raster scan order.

38. A non-transitory computer-readable storage medium having stored thereon instructions that when executed cause one or more processors of a device for decoding video data to:
construct a list of candidate motion vector predictors;
receive a bitstream that includes information including an index into the list of candidate motion vector predictors for selecting a motion vector predictor from the list of candidate motion vector predictors and information for deriving a motion vector for a current block from the selected motion vector predictor, wherein the motion vector refers to a block in an inter-view reference picture or an inter-layer reference picture, wherein the bitstream is constrained such that the derived motion vector is compliant with a motion vector restriction, wherein the motion vector restriction restricts a range of the motion vector to refer to a sub-portion of the inter-view reference picture or inter-layer reference picture, wherein based on the list of candidate motion vector predictors being for merge mode, the bitstream is constrained such that the index into the list of candidate motion vector predictors selects the motion vector predictor that is equal to zero, and wherein based on the list of candidate motion vector predictors being for advanced motion vector prediction (AMVP) mode, the bitstream is constrained such that the index into the list of candidate motion vector predictors selects the motion vector predictor that added with a motion vector difference equals zero;
derive the motion vector for the current block based on the information in the bitstream; and
inter-view prediction decode or inter-layer prediction decode the current block based on pixel values of the block referred to by the derived motion vector.

39. A device comprising:
means for constructing a list of candidate motion vector predictors;
means for receiving a bitstream that includes information including an index into the list of candidate motion vector predictors for selecting a motion vector predictor from the list of candidate motion vector predictors and information for deriving a motion vector for a current block from the selected motion vector predictor, wherein the motion vector refers to a block in an inter-view reference picture or an inter-layer reference picture, wherein the bitstream is constrained such that the derived motion vector is compliant with a motion vector restriction, wherein the motion vector restriction restricts a range of the motion vector to refer to a sub-portion of the inter-view reference picture or inter-layer reference picture, wherein based on the list of candidate motion vector predictors being for merge mode, the bitstream is constrained such that the index into the list of candidate motion vector predictors selects the motion vector predictor that is equal to zero, and wherein based on the list of candidate motion vector predictors being for advanced motion vector prediction (AMVP) mode, the bitstream is constrained such that the index into the list of candidate motion vector predictors selects the motion vector predictor that added with a motion vector difference equals zero;
means for deriving the motion vector for the current block based on the information in the bitstream; and means for inter-view prediction decoding or inter-layer prediction decoding the current block based on pixel values of the block referred to by the derived motion vector.

* * * * *